United States Patent [19]

Ritter

[11] Patent Number: 5,623,549
[45] Date of Patent: Apr. 22, 1997

[54] CIPHER MECHANISMS WITH FENCING AND BALANCED BLOCK MIXING

[76] Inventor: Terry F. Ritter, 2609 Choctaw Trail, Austin, Tex. 78745

[21] Appl. No.: 380,960

[22] Filed: Jan. 30, 1995

[51] Int. Cl.$^6$ ........................................ H04L 9/18
[52] U.S. Cl. .................................. 380/37; 380/42
[58] Field of Search .................... 380/37, 42, 36

[56] References Cited

U.S. PATENT DOCUMENTS

| | | | |
|---|---|---|---|
| 4,157,454 | 6/1979 | Becker | 380/37 |
| 4,168,396 | 9/1979 | Best | 380/37 |
| 4,195,200 | 3/1980 | Feistel | 380/37 |
| 4,316,055 | 2/1982 | Feistel | 380/37 |
| 5,003,596 | 3/1991 | Wood | 380/37 |
| 5,003,597 | 3/1991 | Merkle | 380/37 |

FOREIGN PATENT DOCUMENTS

| | | | |
|---|---|---|---|
| 58-201436 | 11/1983 | Japan | 380/37 |
| 5-95350 | 4/1993 | Japan | 380/37 |

OTHER PUBLICATIONS

"Keyed Balanced Size–Preserving Block Mixing Transforms," Ritter (Mar. 12, 1994) at Internet Newsgroup sci.crypt.publication.
Schweier, (1996) "Applied Cryptography" 2nd Ed John Wiley & Sons p. 50.
"Network Security", Section 2.6 Hash Algorithms, Kaufman et al (1995) pp. 53 & 486.
"Parallel FFT Hashing", Schnorr et al. pp. 1–2 delivered at Fast Software Encryption (Dec. 1993) Cambridge, England.
"Black Box Cryptanalysis of Hash Networks Based on Multiplications," Schnorr et al (May 9–12, 1994) presented at Eurocrypt 1994, Perugia, Italy.
The Efficient Generation of Cryptographic Confusion Sequences, Terry Ritter, Cryptologia, 15(2): 81–139, 1991.
Ritter/Biham Electronic Mail Conversations, dated Feb., 1994.
Keyed Balanced Size–Preserving Block Mixing Transforms, by Terry Ritter, dated Mar. 12, 1994.
Fenced DES, by Terry Ritter, dated Apr. 17, 1994.
The context of the Fenced DES Design, by Terry Ritter, dated Jun. 30, 1994.
Ritter, "Strong Block Ciphers from Weak Ones: NxM DES A New Class of DES Operating Modes", *Ritter Software Engineering*, Posted on Internet Jan. 31, 1994.
Ritter, "Substitution Cipher With Pseudo–Random Shuffling: The Dynamic Substitution Combiner", *Cryptologia*, Oct. 1990, vol. XIV, No. 4, pp. 289–304.
H. Kull and E. Specker, "Direct Construction of Mutually Orthogonal Latin Squares", *Computational Theory and Logic*, 1987, pp. 224–236.
Portz, "On the Use of Interconnection Networks in Cryptography", *Advances in Cryptology—Eurocrypt 1991*, pp. 302–315.

(List continued on next page.)

*Primary Examiner*—Salvatore Cangialosi

[57] ABSTRACT

An enhanced cryptographic mechanism employs Latin square derived balanced size-preserving block mixers and strong, practical fencing arrays of substitution mechanisms in combination with each other and with block ciphers. Ciphers are expanded into efficient, larger, stronger versions. Block ciphers, in combination with balanced block mixers and/or with substitution mechanisms, produce cryptographic mechanisms with block sizes that are combinations of the sizes of the block ciphers. Ciphers using large data blocks can reduce data expansion to levels normally consistent with small blocks. Different sized enhanced cryptographic mechanisms are used in a multiple-size cryptographic mechanism to minimize wasted block space in a ciphered message. The cryptographic mechanism provides at least three layers of processing. In one embodiment a message passes through a fencing array of substitution mechanisms, balanced block mixers, multiple block ciphers, balanced block mixers, and another fencing array of substitution mechanisms, for encryption and decryption, yet still ciphers at a rate near that of the block ciphers alone.

10 Claims, 22 Drawing Sheets

OTHER PUBLICATIONS

Kam et al., "Structured Design of Substitution–Permutation Encryption Networks", *IEEE Transactions On Computers,* Oct. 1979, vol. C–28, No. 10, pp. 747–753.

Feistel, "Cryptography and Computer Privacy", *Scientific American,* May 1973, vol. 228, No. 5, pp. 15–23.

Massey, "Safer K–64: A Byte–Oriented Block–Ciphering Algorithm", *Fast Software Encryption,* 1994, Ross Anderson ed. Springer–Verlay, pp. 1–17.

Lai et al., "A Proposal for New Block Encryption Standard", *Advances in Cryptology—Eyrocrypt '90,* 1990 pp. 389–404.

Massey et al., "Non–Expanding, Key–Minimal, Robustly–Perfect, Linear and Bilinear Ciphers", *Advances In Cryptology—Eurocrypt '87,* pp. 237–247.

Stevens, "The Completely Orthogonalized Latin Square", *Annals of Eugenics,* 1939, 9:82–93.

"Parallel FFT–Hashing" C.P. Schnorr & S. Vaudenay Fast Software Encryption, Cambridge Security Workshop Cambridge, U.K., Dec. 9–11, 1993, Proceedings Springer–Verlag.

"Black Box Cryptanalysis of Hash Networks Based on Multipermutations" Schnorr & Vaudenay Advances in Cryptology—Eurocrypt '94 Springer–Verlag.

CIPHER MECHANISMS WITH FENCING AND BALANCED BLOCK MIXING

BACKGROUND OF THE INVENTION

1. Field of the Invention

This invention relates to cryptography, and more particularly, to constructing and enhancing cryptographic mechanisms.

2. Description of Related Art

Cryptographic mechanisms are used in many fields to improve the security of stored and transmitted data and signals, to authenticate data and signals and to provide protection and privacy of data and signals. Cryptographic mechanisms are used, for example, in communication systems such as digital telephone systems (for both audio and video communications) and in data processing systems to maintain privacy and secrecy of stored and transmitted data, and to authenticate signals and data.

The transformation of signals or data so that their contents cannot be determined is called encryption. The re-transformation of an encrypted signal or data to get back the original signal or data is called decryption. The combination of encryption and decryption is called cryptography and is carried out by cryptographic mechanisms. For example, FIG. 1 shows a typical cryptographic mechanism 100. Cryptographic mechanism 100 includes an encryption mechanism component 102 and a decryption mechanism component 104. Data encryption operates via the encryption mechanism 102 on an input signal or data (plaintext) P (via a channel 106) to produce an encrypted output signal or data (ciphertext) C (via a channel 108). Similarly, the ciphertext C is decrypted using the decryption mechanism 104 to produce the plaintext P. Most cryptographic mechanisms 100 use cryptographic keys 110, 112 to select the transformation used in encryption and decryption. A cryptographic mechanism 100 can viewed as a filter, taking a first signal and producing another signal corresponding to the encryption or decryption (as appropriate) of the first signal.

Cryptographic mechanisms can be broadly categorized into two classes, namely stream and block devices. In stream cryptographic mechanisms, the input plaintext is encrypted one unit (e.g., one bit or character) at time. Decryption in these stream devices also takes place one unit at a time. In block cryptographic mechanisms, the plaintext is encrypted (and decrypted) in blocks of units, e.g., 64-bit blocks.

Cryptographic mechanism 100 may be implemented entirely in electronic hardware, entirely in software operating on a computer, or in a hybrid combination of both hardware and software. FIG. 2 is a schematic diagram of a hybrid implementation of cryptographic mechanism 100 which employs one or more cipher mechanisms 114, one or more CPUs 116, and memory 118. Each of the encryption mechanism 102 and the decryption mechanism 104 may have its own cipher mechanism 114, CPU 116, and memory 118, or some or all of these components may be shared. Cipher mechanism 114 implements a particular cipher and may be on its own chip and include its own computer. Other aspects of the cryptographic mechanism 100 are implemented using the CPU 116 and the memory 118, in combination with the cipher mechanism 114.

Cryptographic mechanisms are used in many systems to perform a number of functions, including, but not limited to, authenticating and verifying data (transmitted or stored), hashing data, and encrypting and decrypting messages, data and signals. As examples, a communications system and a computer system, both employing cryptographic mechanisms for various purposes, are described herein. These systems are described only as examples of systems which employ cryptographic mechanisms and of the uses of cryptographic mechanisms in those systems. These examples are not intended to be a complete enumeration of all possible systems in which a cryptographic mechanism of the type described herein could be used, nor are they intended to be a complete enumeration of the various uses of cryptographic mechanisms in those systems.

Cryptographic mechanisms are used in a typical communication system 120, such as shown in FIG. 3(a) to ensure, inter alia, the secrecy and privacy of communications within the system. In communication system 120, communication devices 122 communicate messages over channels 124. Communication devices 122 may, for example, be computer systems, telephones, facsimile devices, or the like, alone or in combination. The channels 124 may, for example, be regular telephone wires, fiber optic cables, radio waves, microwaves, or the like, alone or in combination. The messages transmitted over the channels 124 may be voice or data, they may be video signals, pictures, or any other form of transmittable data.

Many data communication systems are open, having some or all of the channels 124 insecure. This is especially the case when one or more of the channels employs radio waves which are detectable and easily monitored without affecting the communication system itself. For example, in the case where the communication system 120 is a telephone network, with some of the devices 122 being cellular telephones, some of the channels 124 being radio channels, and the messages being telephone conversations, i.e., voice messages, between users of telephones, the contents of the messages which are sent over radio channels 124 can be monitored by listening in on the appropriate broadcast frequency.

To overcome problems presented by open, insecure channels in communication systems, it is desirable to make it difficult, if not impossible, for someone to ascertain the content of a monitored message. To this end, it is desirable to transform or encode messages, prior to their transmittal over open channels, into messages whose contents cannot be determined. Clearly it is necessary to be able to transform an encoded, transmitted message back to its original message so that the intended recipient can determine its contents.

Thus, in order to overcome the insecurity of communication messages between communication devices 122 over open channels 124 in communication system 120, it is desirable to encrypt messages prior to their transmittal by a communication device 122 and to decrypt them upon receipt by another communication device 122. In this way, by the time a message can be intercepted, i.e., by the time a message is available on an open channel, its contents cannot be determined without being decrypted. To this end, with reference to FIGS. 3(a) and 3(b), each communication device 122 has a message generator/receiver 126 connected via internal (secure) channel 128 to cryptographic mechanism 100. (Cryptographic mechanism 100 corresponds to the cryptographic mechanism 100 of FIG. 1.) As noted above, a typical cryptographic mechanism 100 is keyed, that is, it uses a cryptographic key 110 or 112 to control its encryption/decryption functions. Communication between communication devices 122 over open channels 124 takes place via cryptographic mechanisms 100. For example, in a transmit mode, the message generator/receiver 126 of one communication device 122 produces a plaintext message which is sent over internal channel 128 to cryptographic mechanism 120 of that communication device 122. Cryptographic mechanism 100 uses a cryptographic key 110 to control the encryption of the plaintext message, producing a ciphertext message which is transmitted over open channel 124. Anyone intercepting the transmitted ciphertext message would be unable to determine its contents (i.e., the plaintext message) without first decrypting the message. The ciphertext message is sent, via channel 124 to another communication device 122. At the other communication device 122, cryptographic mechanism 100 receives the ciphertext message and decrypts it using the same cryptographic key 112, producing the plaintext message. The plaintext message is then sent over the internal channel 128 of communication mechanism 122 to the message generator/receiver 126.

The internal channel 128 may be a real channel in a device or it may be a logical (i.e., virtual channel). In other words, the cryptographic mechanism 100 may be integrated with the message generator/receiver 126 in such a way that the actual channel 128 is not physically discernable or it may be a separate device connected via an internal data bus of some sort.

Cryptographic mechanisms are used in computer systems such as computer system 130 shown in FIG. 3(c), having one or more computers 132 connected to each other and to at least one storage device 134 via a bus 136. Storage device 134 may be fixed, e.g., a hard disk, or it may be portable, e.g., a floppy disk, an optical disk, a tape, or the like. Each computer 132 may also have its own local storage device (not shown). In computer system 130, a cryptographic mechanism 100 (FIG. 1) is used, inter alia, to verify data (stored on a computer 132 or a storage device 134, or transmitted between computers 132), to keep data secret and private, and to prevent unauthorized access to data (stored on a storage device 134 or a computer 132, or transmitted between computers 132).

For example, with reference to FIG. 3(c), a computer 132 in computer system 130 stores (via bus 136) data in a file 138 on a storage device 134. In order to prevent unauthorized access to the data in the file 138, whether by other users of the computer system 130, or by someone gaining access to the file 138 in some other way, it is desirable to store the data in an encrypted form. Note that access to the data can be gained by obtaining the storage device 134 or by gaining access to the bus 136 while the data is being transferred from the computer 132 to the storage device 134. To this end, the computer 132 includes a cryptographic mechanism 100 (FIG. 1) for encrypting and decrypting stored data.

As a further example of the use of a cryptographic mechanism, in the communication system 120 of FIG. 3(a), or computer system 130 of FIG. 3(c), or the like, it is sometimes desirable to use only one aspect of the cryptographic mechanism 100. In particular, it is sometimes desirable to use only the encryption mechanism (reference numeral 102 of FIG. 1) to encrypt data in order to authenticate the data. To this end, the cryptographic mechanism 100 can be used to provide an authentification function. Data or signals to be authenticated are encrypted or hashed (controlled by a cryptographic key) by the cryptographic mechanism 100 to produce a value representative of the data. If the data changes then its corresponding encryption value will change, thereby allowing authentification.

In the cryptographic mechanisms described herein, the manner in which keys are provided to the mechanisms is well known and therefore is not described in detail. For example, each communication device 122 or computer 132 may have some means for creating, storing and inputting keys when need, and for providing these keys to their cryptographic mechanisms in a conventional manner.

The above examples (the communications system and the computer system) are only some examples of fields, mechanisms, devices and systems which employ cryptographic mechanisms, and they are not intended to be a complete enumeration of all possible systems in which a cryptographic mechanism of the type described herein could be used.

Cryptographic mechanisms 100 employed in the same system, whether it be a communication system 120, a computer system 130, or the like, must be of the same type in order to be able to function together. This is not to say that the mechanisms must use the same implementations, only that the mechanisms must perform the same encryption and decryption functions. For example, cryptographic mechanism 100 may be implemented entirely in electronic hardware, entirely in software operating on a computer, or in a hybrid combination of hardware and software (as shown above with respect to FIG. 2). Such differently implemented mechanisms can readily be employed in the same system as long as the mechanisms perform the same or compatible encryption and decryption functions.

Throughout this application, including the claims, the term "mechanism" is intended to include all possible implementations (such as electronic hardware, computer implemented software, hybrids, or the like) or the process performed. Thus a cryptographic or cipher mechanism refers to either a process of enciphering and/or deciphering or any implementation (for example, hardware, computer implemented software, hybrid, or the like) for performing the process. Furthermore, the terms "cipher" and "ciphering" are employed to refer generally to both enciphering and deciphering.

To ensure that various cryptographic mechanisms perform the same encryption and decryption functions, various national and international standards have been set for cryptographic mechanisms and techniques. One example is the Data Encryption Standard (DES). DES is a block cipher that encrypts data in 64-bit blocks. DES takes a 64-bit plaintext and a key, effectively 56 bits long, to produce a 64-bit ciphertext. Decryption in DES takes 64-bit blocks of ciphertext and the same key to reproduce 64-bit blocks of plaintext. The effective DES key length is 56 bits (usually the key is expressed as a 64-bit number, with every eighth bit used for parity checking).

DES has been adopted as an American National Standards Institute (ANSI) standard (ANSI X3.92) and, as part of the standard, the National Institute of Standards and Technology (NIST) validates hardware and firmware implementations of DES. This validation confirms that the implementation follows the standard. The standard does not allow software versions of DES, unless they are unchangeably fixed within a hardware device (for example, by using a read-only memory to hold the hardware control instructions which implement the DES cryptographic mechanism). However, uncertified software versions of DES are common.

The security of DES has been questioned and attempts have been made to increase and improve it. Two aspects of DES relating to its security are the key length and the block size.

Doubling the block size of cipher mechanisms using multiple encryptions has been proposed in order to strengthen them. However, proposed techniques are subject to cryptanalysis.

Attempts have been made to improve DES by using multiple DES operations in sequence (using the same or different keys for each round of DES). Unfortunately, double DES (using DES to again encipher a message already encrypted by DES) has been shown to be barely stronger than DES itself. When a known plaintext-ciphertext pair is available, a search of all possible keys for the input operation, and all keys for the output operation will break the system. It has been shown that if DES has certain mathematical properties (namely if DES is a group) then cryptanalysis of DES (that is, breaking DES) would be easier than if it does not have those properties. Further, if DES has those mathematical properties, then multiple encryption would be useless and would actually weaken DES. To date it has not been shown whether DES has those mathematical properties (i.e., whether DES is a group) but most research points away from it having them. Assuming DES is not a group, the result of triple-DES (passing a message through DES three times, with the same or different keys) may be much harder to break than that of DES or double-DES. However, triple-DES is expensive and complex, and may require three hardware DES implementations and interconnecting hardware, or three software DES executions. In general multiple encryption using the same encryption technique and key does not affect the complexity of a brute-force cryptanalysis. Multiple keys are needed to enhance security.

Many other block ciphers have been developed and some of these may eventually overtake or replace DES in usage. The most likely successor to DES at present is a block cipher called IDEA. IDEA operates on 64-bit plaintext blocks using a 128-bit key (more than twice the effective key length of DES). Current software implementations of IDEA are about as fast as DES. A hardware implementation of IDEA encrypts data at a rate of 177 Mbits/second when clocked at 25 MHz. The security of the IDEA cipher is not yet known, and even if it is adopted in some areas, it will be some time before it overtakes DES in use.

In general, the displacement of a commonly-used cipher by a new cipher will not take place until the community of users is satisfied that the new cipher is more secure than the old one. Since ciphers are often implemented by hardware cipher mechanisms, a change in ciphers can be expensive and may require extensive changes to a system employing them. In a large system, with some cryptographic mechanisms implemented in hardware, some in software, and others in hybrid form, changing or updating a cipher is not only costly, but potentially error prone. For example, in the communication system 120 of FIGS. 3(*a*)–3(*b*), each of the cryptographic mechanisms 100 in every communication device 122 would have to be replaced. Or in a computer network employing computers 132 as in the computer system 130 of FIG. 3(*c*), the cryptographic mechanisms 100 on each computer 132 in the system would have to be replaced. On the other hand, when there are widespread suspicions of weakness of an existing highly used cipher, it would be useful to enhance existing systems which use that cipher.

SUMMARY OF THE INVENTION

This invention provides enhanced cryptographic mechanisms employing combinations of balanced, size-preserving block mixers, arrays of substitution mechanisms, and cipher mechanisms. When cipher mechanisms are used, the enhanced cryptographic mechanisms enhance the cipher mechanisms. The cipher mechanisms can be DES or IDEA mechanisms, or any other block cipher mechanisms, including embodiments of the present invention, and the enhanced cryptographic mechanisms increase the strength of those ciphers.

Cipher mechanisms are enhanced by having their block size increased. This increase is achieved using balanced block mixers or arrays of substitution mechanisms to spread an input to the cryptographic mechanism into multiple cipher mechanisms. Cipher mechanisms are also enhanced by transforming their inputs and outputs using balanced block mixers and arrays of substitution mechanisms.

In another aspect, this invention is a key-balanced, size-preserving block mixer for mixing two input blocks to produce two balanced output blocks, and a method of making a balanced block mixer. A balanced block mixer has two combiners, each of which combines both of the input blocks to the balanced block mixer into one output block of the mixer, such that: (i) every possible input block produces a different output block, and every possible output block is produced by a different input block; (ii) each output block is a function of both input blocks; (iii) any change to any one of the input block values changes both of the output block values; and (iv) stepping either of the input blocks through all possible values while keeping the other of the input blocks fixed steps each of the output blocks through all possible values. The method of making balanced block mixers with these properties uses techniques of constructing orthogonal Latin squares.

In another aspect, this invention is a multiple-size cryptographic mechanism which has a number of cryptographic mechanisms of different sizes and means for selecting among these cryptographic mechanisms in order to process a message. The selecting means decides which cryptographic mechanisms to use so as to minimize wasted block space in the output message.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which:

FIG. 3(*b*) is a schematic diagram of a communication device of the communication system of FIGURE 3(*a*);

FIG. 3(*c*) is a computer system employing a cryptographic mechanism according to the present invention;

DESCRIPTION OF THE PRESENTLY PREFERRED EXEMPLARY EMBODIMENTS

Various embodiments of enhanced cryptographic mechanisms will now be described. These embodiments employ selected combinations of cipher mechanisms, balanced block mixers, and arrays of substitution mechanisms to produce cryptographic mechanisms. When a cipher mechanism is employed, the appropriate addition of balanced block mixers and substitution mechanisms enhances the strength of the cipher mechanism.

Figure 3A:
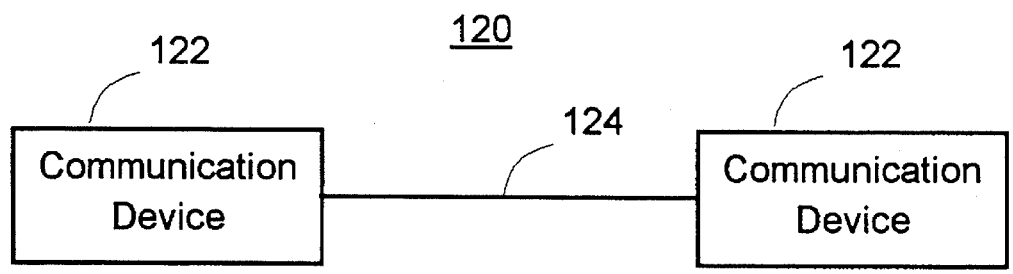
FIGS. 3(*a*) depicts a communication system employing a cryptographic mechanism according to the present invention.
Figure 3B:
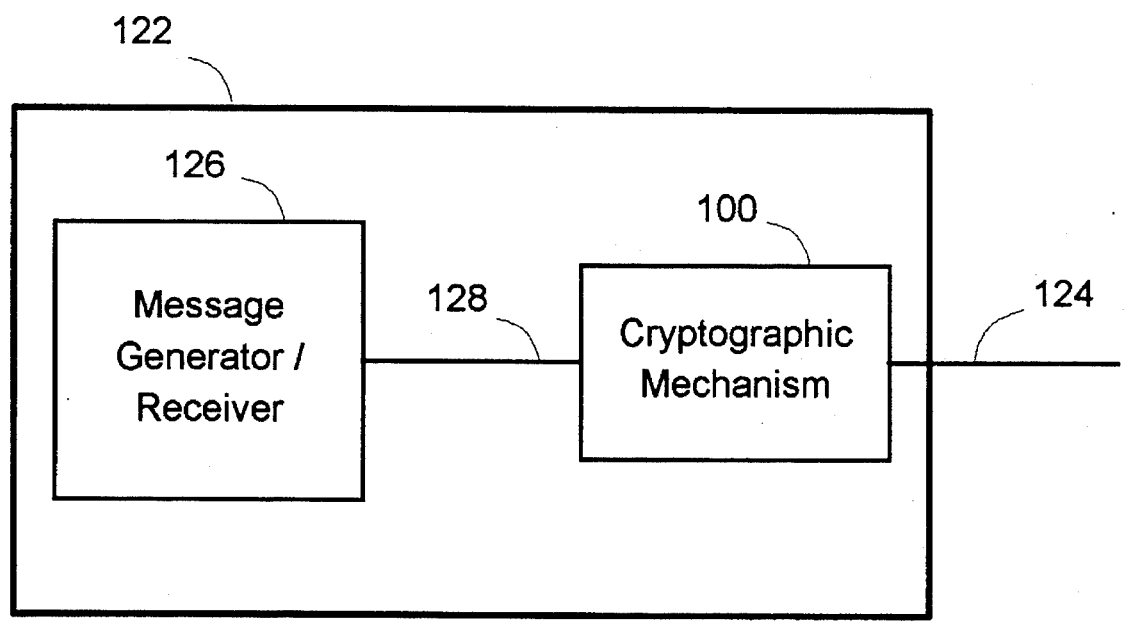
Figure 3C:
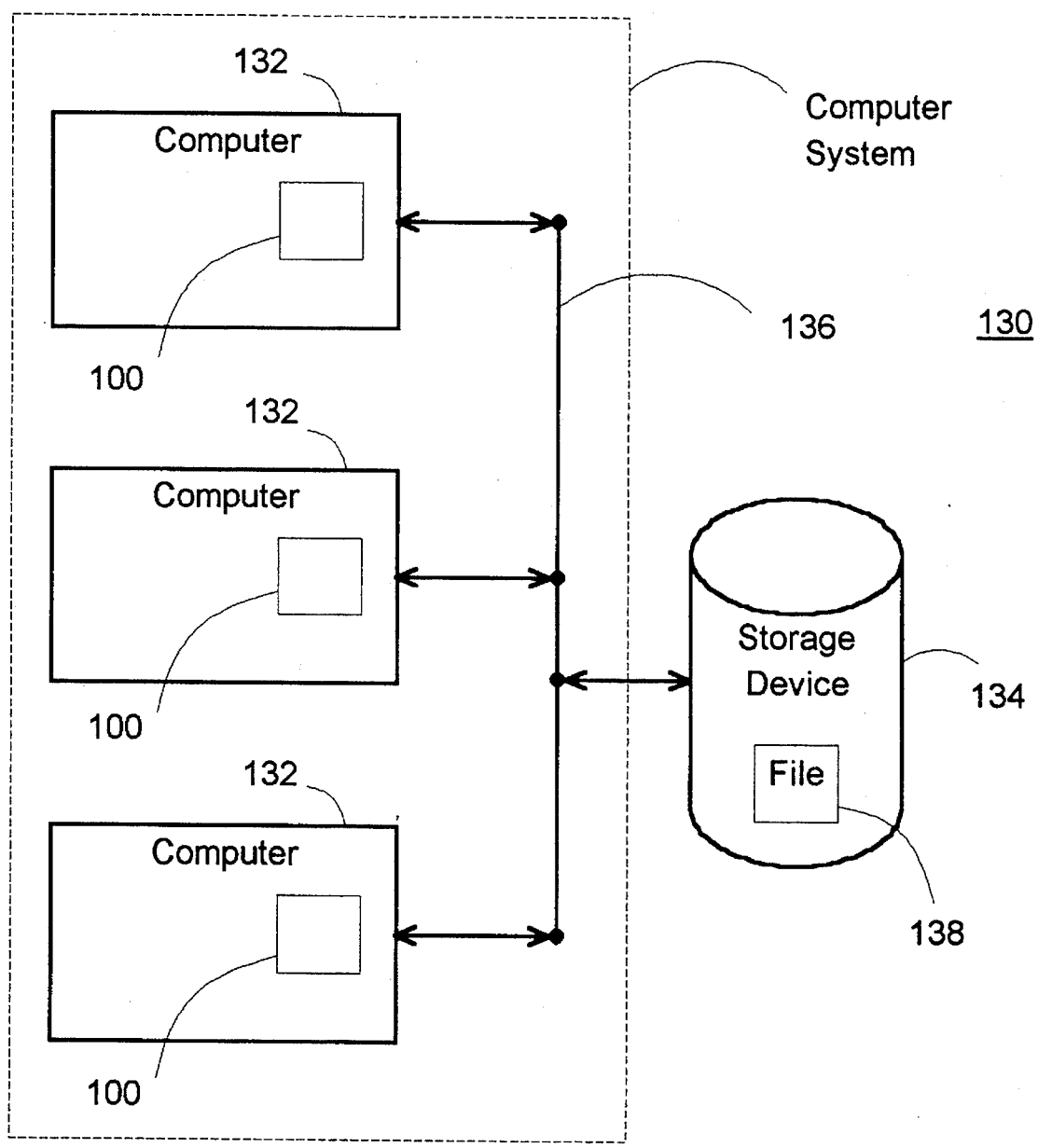

The operation of these cryptographic mechanisms is sometimes explained herein in the context of systems within which the mechanisms might be used, for example, a communications system such as that of FIG. 3($a$), or a computer system such as that of FIG. 3($b$), however, the use of the cryptographic mechanism of the present invention is in no way intended to be limited to those systems.

Increasing the Block Size of Block Ciphers using Balanced Block Mixers

Figure 1:
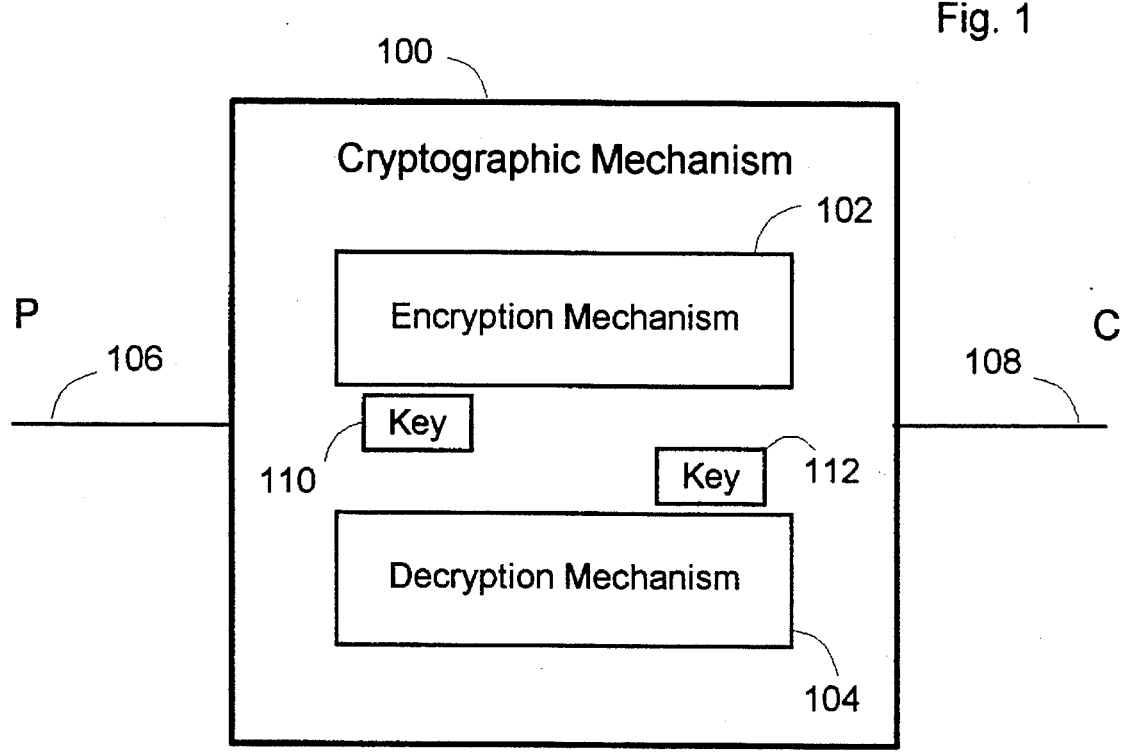
FIG. 1 depicts a cryptographic mechanism according to the present invention.
Figure 2:
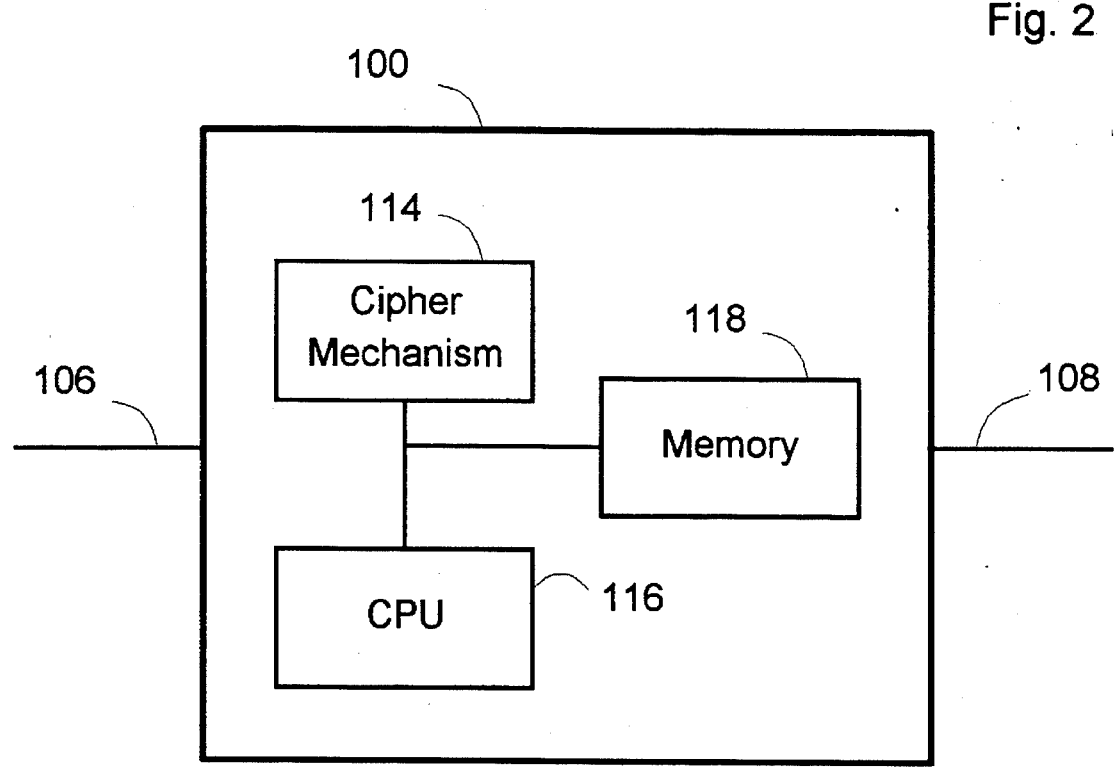
FIG. 2 is a schematic diagram of an implementation of the cryptographic mechanism of FIG. 1.

One form of enhanced cryptographic mechanism employs balanced block mixers (described below in detail) in combination with other block cipher mechanisms to increase the input block size of the other cipher mechanisms. For example, with reference to FIGS. 1, 4($a$) and 4($b$), the encryption mechanism 102 of cryptographic mechanism 100 has balanced block mixers 140 and 142, and block cipher mechanisms 144$a$ and 144$b$, each block cipher mechanism implementing an n-bit block cipher. The decryption mechanism 104 of the cryptographic mechanism 100 has balanced block mixers 146 and 148 and block cipher mechanisms 150$a$ and 150$b$, each block cipher mechanism implementing the n-bit cipher. The cipher mechanisms can be DES or IDEA mechanisms or any other n-bit block cipher mechanisms. The block cipher mechanisms 150$a$ and 150$b$ need not be the same mechanism, for example, one can be DES and the other can be IDEA. An input message block $P_{2n}$ of size 2n-bits to be encrypted is split into two n-bit data blocks $A_n$ and $B_n$ (herein the subscript is the size of the block in bits). Data blocks $A_n$ and $B_n$ are mixed by balanced block mixer 140 to produce two output n-bit data blocks $X_n$ and $Y_n$. Data blocks $X_n$ and $Y_n$ are then input to cipher mechanisms 144$a$ and 144$b$, respectively, and encrypted (using the appropriate keys), to produce encrypted n-bit data blocks $X_n'$ and $Y_n'$. Data blocks $X_n'$ and $Y_n'$ are mixed using balanced block mixer 142, producing n-bit data blocks $E_n$ and $D_n$. The output of the encryption mechanism 102 (and thus of the cryptographic mechanism 100) is the 2n-bit output message block $C_{2n}$ formed by joining the two n-bit blocks $E_n$ and $D_n$. Balanced block mixers 140 and 142 can perform the same or different balanced block mixing transform. In a communication system 120 such as depicted in FIG. 3($a$), the output message $C_{2n}$ is sent over the open channel 124 to another communication device 122 in the communication system. In a computer system 130 such as depicted in FIG. 3($c$), the output message is saved in a file or is transmitted to another computer 132 in the system or is further processed.

Figure 4A:
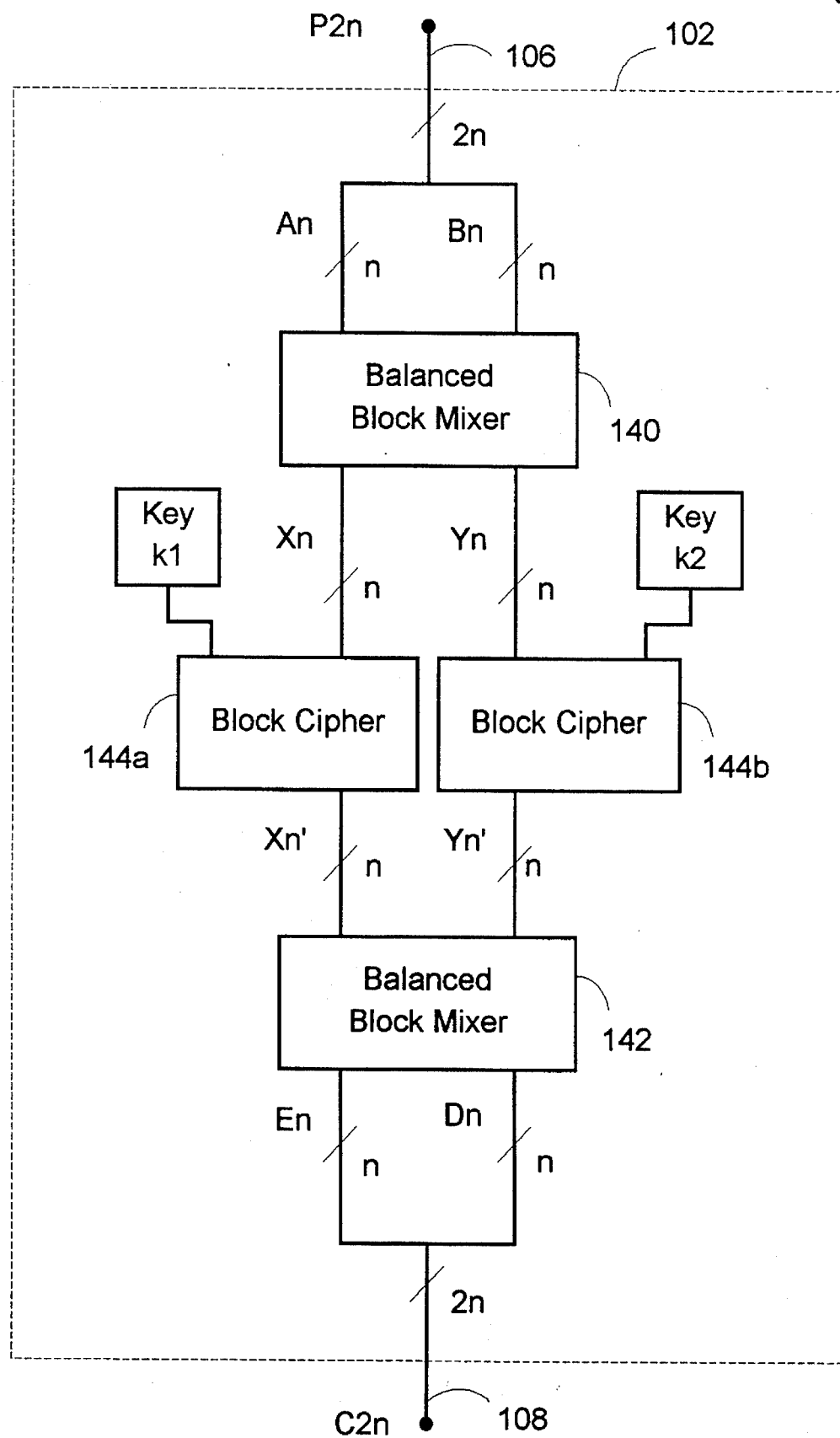
FIGS. 4(*a*) and 4(*b*) are schematic diagrams of cryptographic mechanisms which employ block mixers according to the present invention, in conjunction with block ciphers.
Figure 4B:
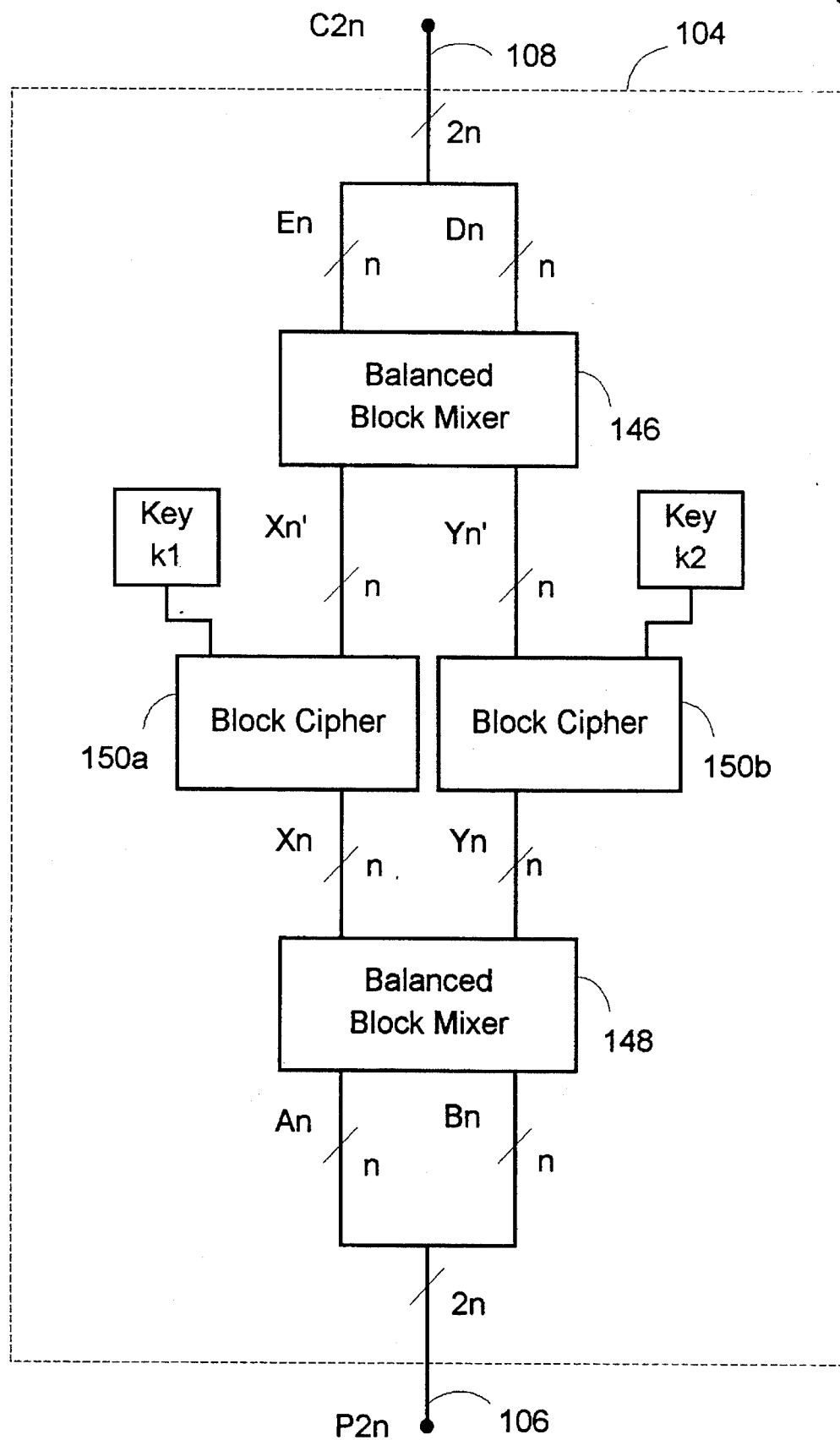

Decryption of the output message $C_{2n}$ (for instance, in another communication device 122 in the communication system 120) is achieved using decryption mechanism 104 of cryptographic mechanism 100 as follows, with reference to FIG. 4($b$). In the mechanism of FIG. 4($b$) (with reference also to FIG. 4($a$)), balanced block mixer 146 is the inverse of balanced block mixer 142, and balanced block mixer 148 is the inverse of balanced block mixer 140. Further, cipher mechanisms 150$a$ and 150$b$ are the inverse mechanisms of cipher mechanisms 144$a$ and 144$b$, respectively.

The ciphertext message $C_{2n}$ is split into two n-bit data blocks $E_n$ and $D_n$, which are mixed by balanced block mixer 146 to produce two n-bit mixed data blocks $X_n'$ and $Y_n'$. The two mixed data blocks are then decrypted using cipher mechanisms 150$a$ and 150$b$ to produce decrypted data blocks $X_n$ and $Y_n$. These decrypted data blocks are input to balanced block mixer 148 which mixes them to produce n-bit data blocks $A_n$ and $B_n$ which are then joined to produce the 2n-bit decrypted plaintext message $P_{2n}$.

If $A_n$ and $B_n$ are each 64-bit data blocks, and the cipher mechanisms 144$a$, 144$b$, 150$a$ and 150$b$ are DES mechanisms, then the cryptographic mechanism in FIGS. 4($a$) and 4($b$) encrypts and decrypts 128-bit messages using DES. For example, the decryption mechanism 104 takes a 128-bit ciphertext (produced by an encryption mechanism 102), splits it in two 64-bit parts, $E_n$ and $D_n$) and mixes it with balanced block mixer 146 to produce two 64-bit data blocks as inputs to two DES decryption mechanisms 150$a$ and 150$b$ (with the same or different keys, $k_1$ and $k_2$). The two 64-bit output data blocks from DES mechanisms 150$a$ and 150$b$ are each input to balanced block mixer 148 giving two 64-bit data blocks which are joined to produce the 128-bit message block $P_{2n}$.

If the cipher mechanisms 144$a$ and 144$b$ are DES mechanisms, then functionally, the encryption of the message by cryptographic mechanism 100 of FIG. 4($a$) can be written as:

$P_{2n} \rightarrow A_n, B_n$ $MIXER_{140}(A_n, B_n) \rightarrow (X_n, Y_n)$ $DES\ ENCIPHER_{144a}(X_n, k_1) \rightarrow X_n'$ $ENCIPHER_{144b}(Y_n, k_2) \rightarrow Y_n'$ $MIXER_{142}(X_n', Y_n') \rightarrow (E_n, D_n)$ $C_n, D_n \rightarrow C_{2n}$ where $k_1$ and $k_2$ can be the same or different keys, and $MIXER_{140}$ and $MIXER_{142}$ can be the same or different mixing functions. Similarly, the decryption of the ciphertext message $C_{2n}$ can be written as:

$C_{2n} \rightarrow E_n, D_n$ $MIXER_{146}(E_n, D_n) \rightarrow (X_n', Y_n')$ $DES\ DECIPHER_{150a}(X_n', k_1) \rightarrow X_n$ $DES\ DECIPHER_{150b}(Y_n', k_2) \rightarrow Y_n$ $MIXER_{148}(X_n, Y_n) \rightarrow (A_n, B_n)$ $A_n, B_n \rightarrow P_{2n}$ This construct ciphers a double-size DES block at nearly single DES rates. By increasing the block size of the cipher, its strength is potentially increased.

Figure 5A:
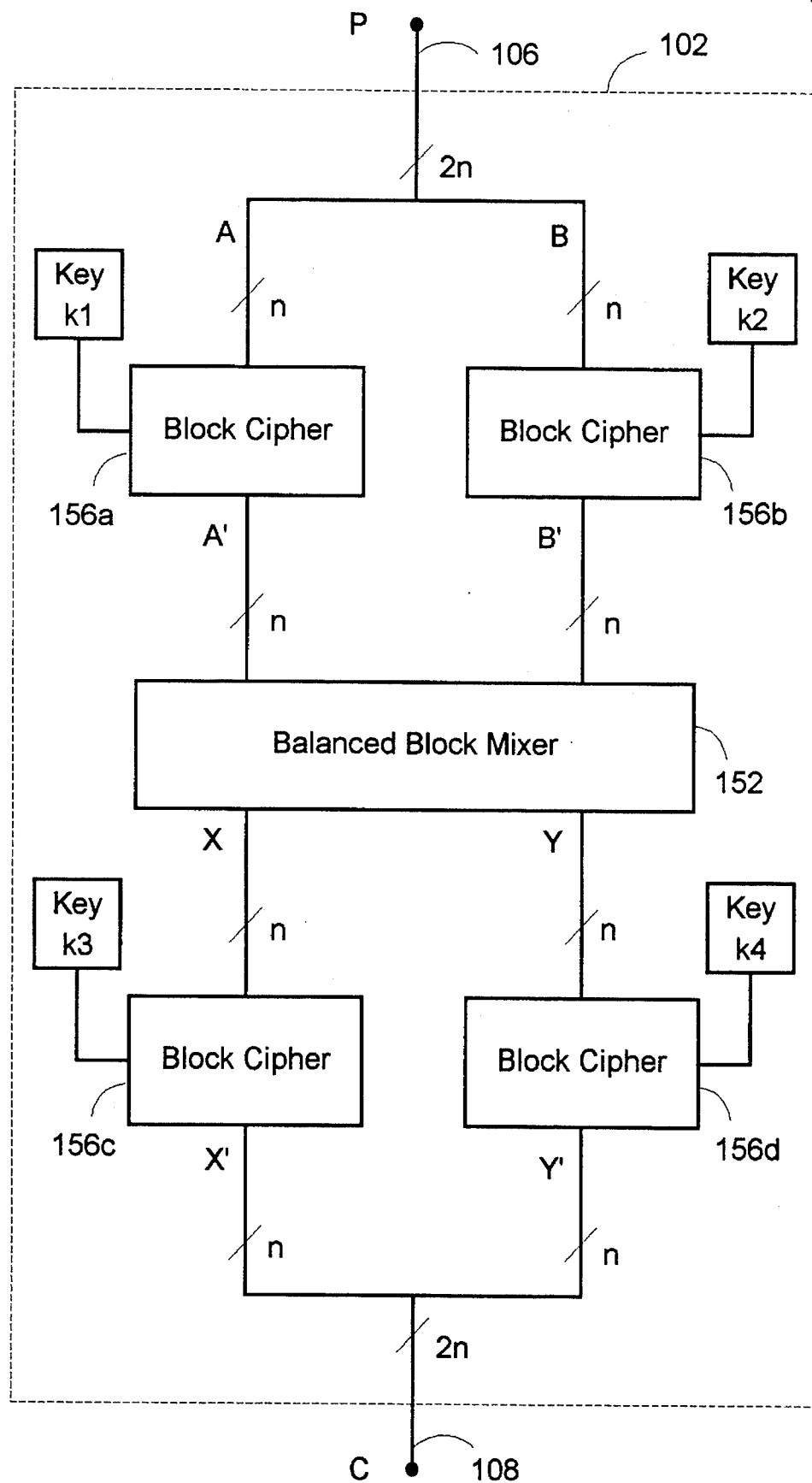
Figure 5B:
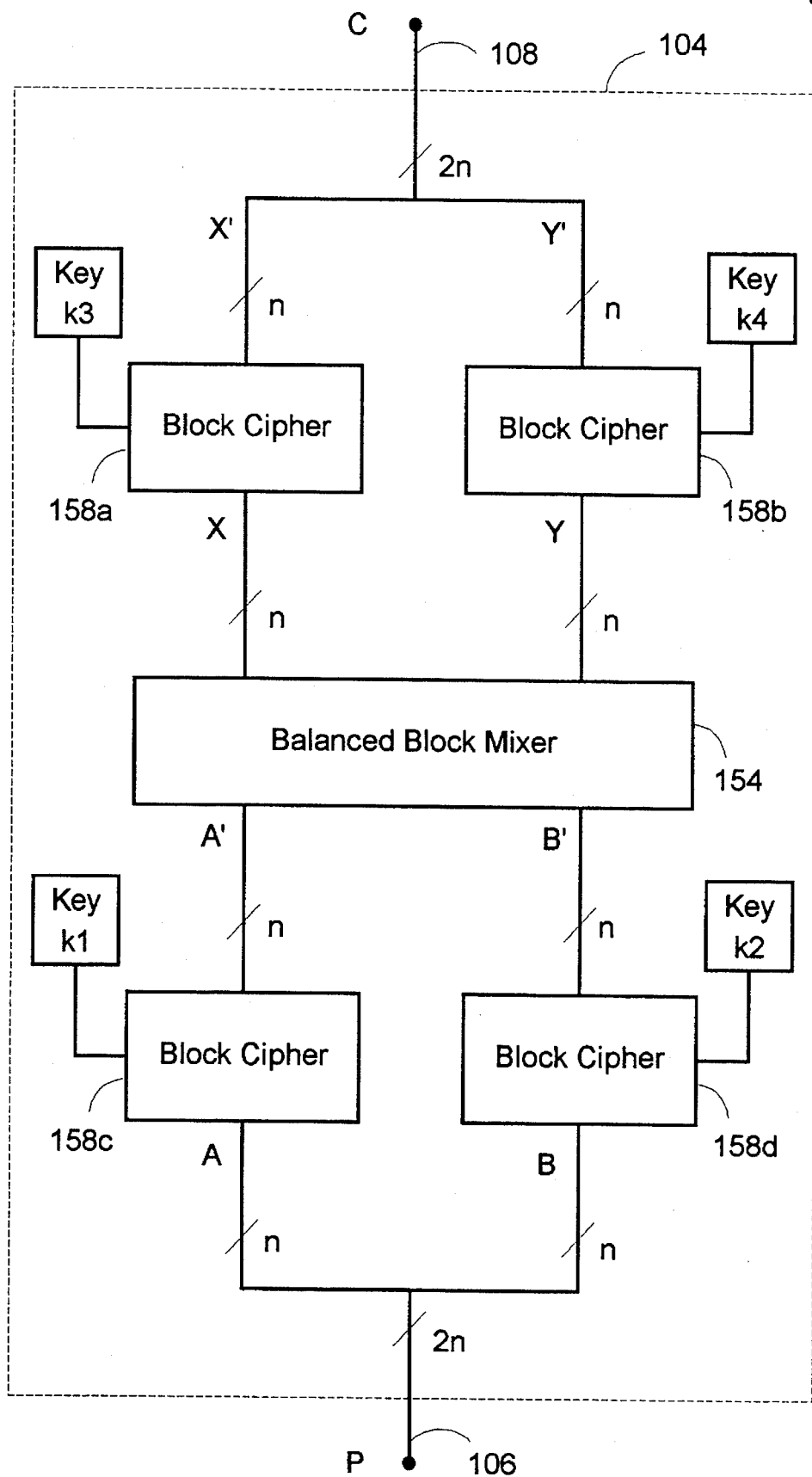

FIGS. 5($a$) and 5($b$) show another embodiment of a cryptographic mechanism 100 consisting of a combination of balanced block mixers and block cipher mechanisms to effectively double the input message block size of the block cipher mechanisms. The encryption mechanism 102 (FIG. 5($a$)) uses balanced block mixer 152, and the decryption mechanism 104 (FIG. 5($b$)) uses the inverse balanced block mixer 154. Cipher mechanisms 156$a$, 156$b$, 156$c$, and 156$d$ (encryption mechanism of FIG. 5($a$)) are inverses of cipher mechanisms 158$c$, 158$d$, 158$a$, and 158$b$, respectively (decryption mechanism of FIG. 5($b$)). An n-bit plaintext input signal P is split into two n-bit data blocks, A and B. Each of these data blocks A and B is encrypted using cipher mechanisms 156$a$ and 156$b$ with the same or different keys, $k_1$, and $k_2$, producing two n-bit encrypted data blocks A' and B'. The two n-bit outputs A' and B' are mixed using balanced block mixer 152 to produce two n-bit data blocks X and Y. Data blocks X and Y are encrypted with cipher mechanisms (156c and 156d) using keys $k_3$ and $k_4$ (which can be the same or different from each other and from keys $k_1$ and $k_2$). The cipher mechanisms 156c and 156d produce n-bit data blocks X' and Y' which are joined to produce a 2n-bit output message signal C (ciphertext).

In the above, the sub-blocks A and B can be created by simply splitting the input block in the middle or by some other form of reversible (invertible) splitting. Similarly, sub-blocks X' and Y' may be joined by simple concatenation or by some other form of reversible accumulation.

Decryption of the ciphertext signal C by the cryptographic mechanism 104 is as follows (with reference to FIG. 5 (b)).

A cryptographic mechanism 100 decrypts a 2n-bit ciphertext signal C as follows. The signal C is split into two n-bit data blocks (corresponding to data blocks X' and Y'). These data blocks are deciphered by cipher mechanisms 158a and 158b, to produce two n-bit data blocks X and Y. Data blocks X and Y are mixed by balanced block mixer 154 (the inverse of balanced block mixer 152 of FIG. 5(a)) to give two n-bit data blocks A' and B' which are then input to the two cipher mechanisms 158c, 158d to produce two n-bit data blocks A and B which are joined to form the 2n-bit plaintext signal P.

Figure 6:
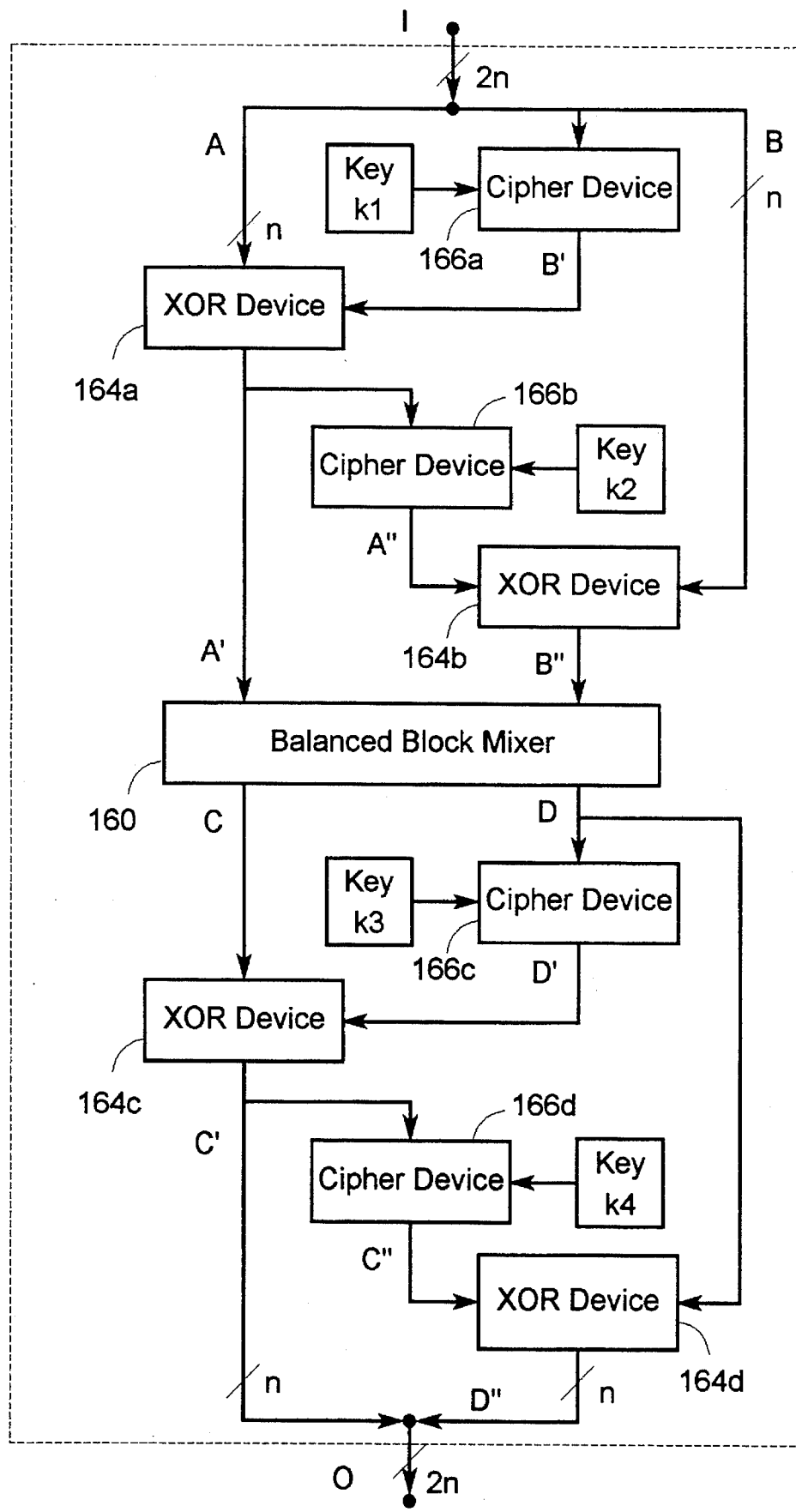

An alternate embodiment of an encryption mechanism 102 for a cryptographic mechanism 100 which ciphers at half the rate of the cipher mechanism it uses is shown in FIG. 6, which uses, in combination, balanced block mixer 160, four exclusive-OR (XOR) mechanisms 164a–164d, and four cipher mechanisms 166a–d with cryptographic keys $k_1$–$k_4$. As in the other cryptographic mechanisms described herein that use more than one cryptographic key, the keys can be the same or different and the balanced block mixers can be the same or different.

In this cryptographic mechanism, a 2n-bit input message signal I is split into two n-bit data blocks A and B. Data block B is encrypted by cipher mechanism 166a, producing n-bit data block B' which is then combined with data block A using XOR mechanism 164a to produce n-bit data block A'. Data block A' is encrypted with cipher mechanism 166b to produce n-bit data block A" which is combined in XOR mechanism 164b with B (from the original input message) to produce n-bit data block B". Data blocks A' and B" are mixed by balanced block mixer 160, producing two n-bit data blocks C and D. Data block D is encrypted with cipher mechanism 166c, producing n-bit data block D' which is combined with data block C by XOR mechanism 164c to produce n-bit data block C'. Data block C' is encrypted by cipher mechanism 166d to produce n-bit data block C" which is combined with data block D by XOR mechanism 164d to produce n-bit data block D". Functionally, the encryption by the mechanism of FIG. 6 can be written as follows:

I→A, B
CIPHER(B, $k_1$)→B'
XOR(A, B')→A'
CIPHER(A', $k_2$)→A"
XOR (B, A")→B"
MIXER$_{160}$(A', B")→(C, D)
CIPHER(D, $k_3$)→D'
XOR(C, D')→C"
CIPHER(C', $k_4$)→C"
XOR (D, C")→D"
C', D"O

The decryption mechanism 104 corresponding to encryption mechanism 102 described above is functionally written as follows, given a ciphertext message 0:

O→C', B"
CIPHER(C', $K_4$)→C"
XOR(C", D")→D
CIPHER(D, $k_3$)→D'p1 XOR(C', D')→C
INVERSE-MIX(C, D)→(A', B")
CIPHER (A', $k_2$)→A"
XOR(B", A")→B
CIPHER(B, $k_1$)→B'
XOR(A', B')→A
A, B→I

Note that the individual ciphers need only encipher, while the structure of FIG. 6 ensures that overall deciphering is possible.

Figure 7:
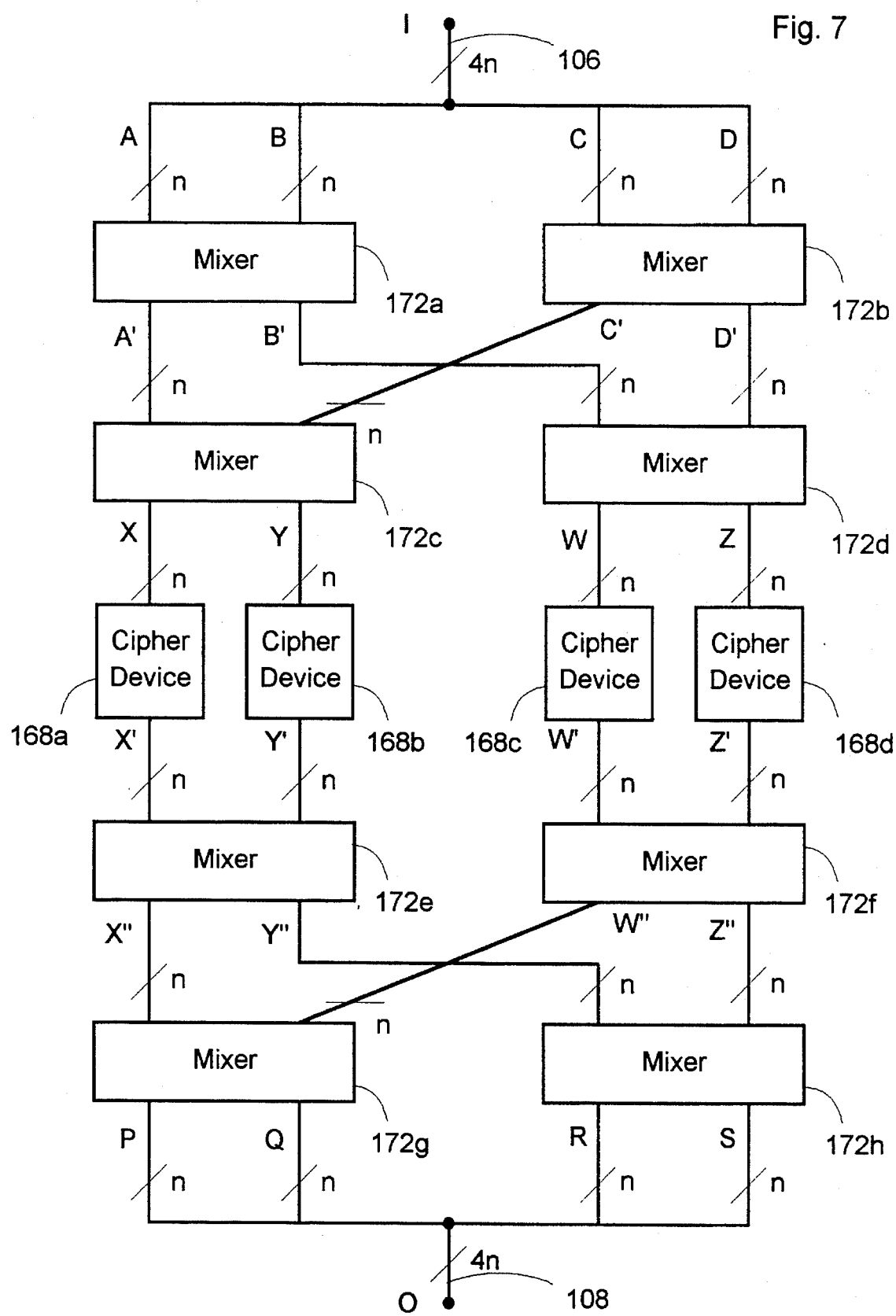
Figure 8:
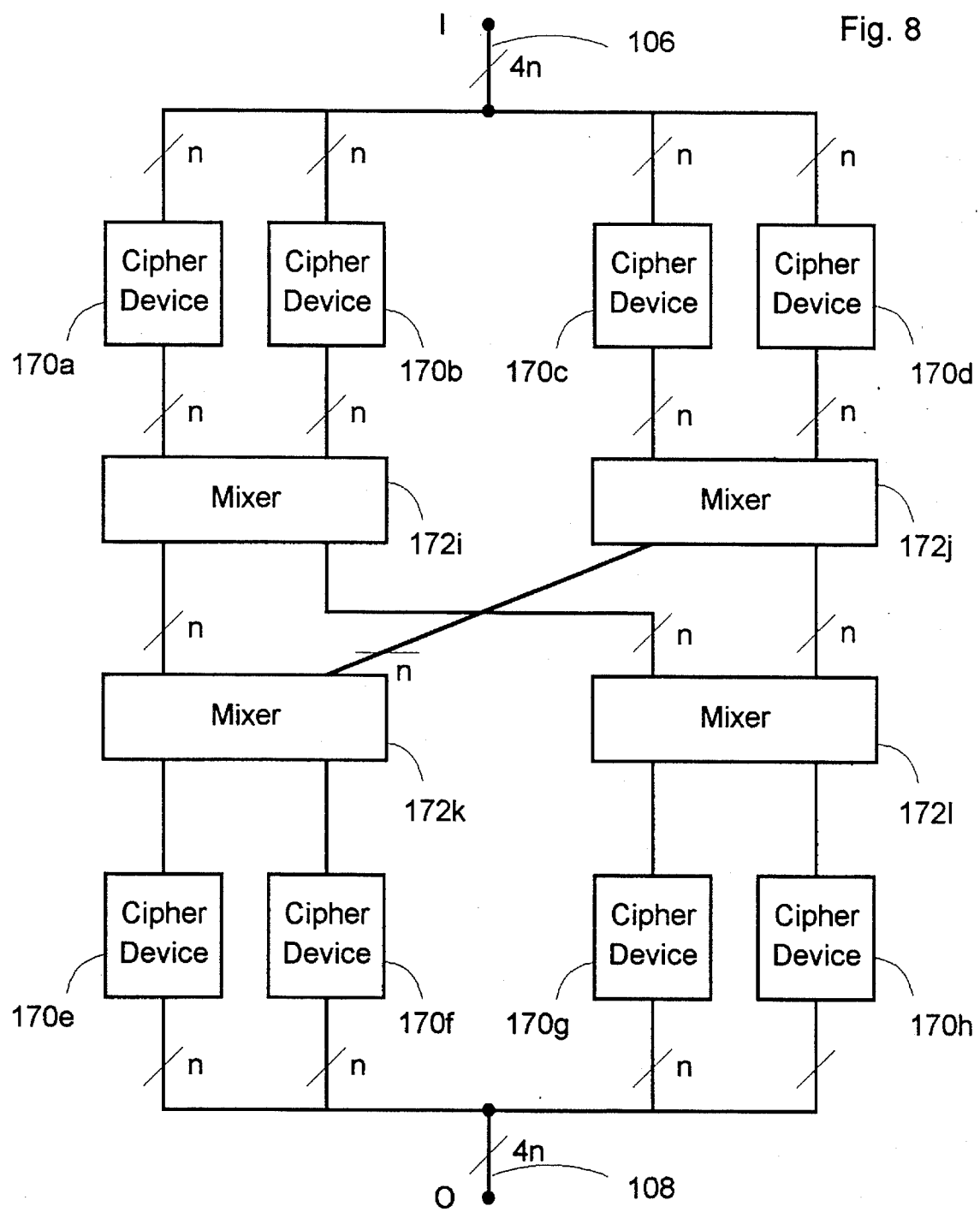

The cryptographic mechanism 100 shown in FIG. 7 ciphers (encrypts and decrypts) quadruple-size cipher mechanism message blocks at nearly single cipher mechanism rates, whereas that shown in FIG. 8 ciphers quadruple-size cipher mechanism message blocks at nearly half single cipher mechanism rates. Thus, if the cipher mechanisms 168a–d and 170a–h in FIGS. 7 and 8 are DES cipher mechanisms, then the cryptographic mechanism 100 shown in FIG. 7 ciphers quadruple-size DES blocks (i.e., 256-bit data blocks) at nearly single DES rates, and that shown in FIG. 8 ciphers quadruple-size DES blocks at nearly half single DES rates. In FIG. 7, I is a 4n-bit input message signal and the reference letters A, B, C, D, A', B', C', D', W, X, Y, Z, W', X', Y', Z', W", X", Y", Z", P, Q, R, and S represent n-bit data sub-blocks. The output signal O (ciphertext) of the mechanism is a 4n-bit signal.

Note that in order to propagate any input changes throughout the mechanism of FIG. 7, four balanced block mixers 172a–172d are used, with one output data block of balanced block mixer 172a being an input to balanced block mixer 172d and one output data block of balanced block mixer 172b being an input to balanced block mixer 172c. Similar construction is used for balanced block mixers 172e–172h in FIG. 7 and balanced block mixers 172i–172l in FIG. 8.

Balanced Block Mixers

All of the mixers referred to above are balanced block mixers which map multiple input code values to the same number of output code values.

Throughout this application, including the claims, the term "balanced block mixer" is intended to include all possible implementations (such as electronic hardware computer implemented software, hybrids, or the like) or the process performed. Thus a balanced block mixer refers to either a process for balanced block mixing or to any implementation (for example, hardware, computer implemented software, hybrid, or the like) for performing balanced block mixing.

Figure 9A:
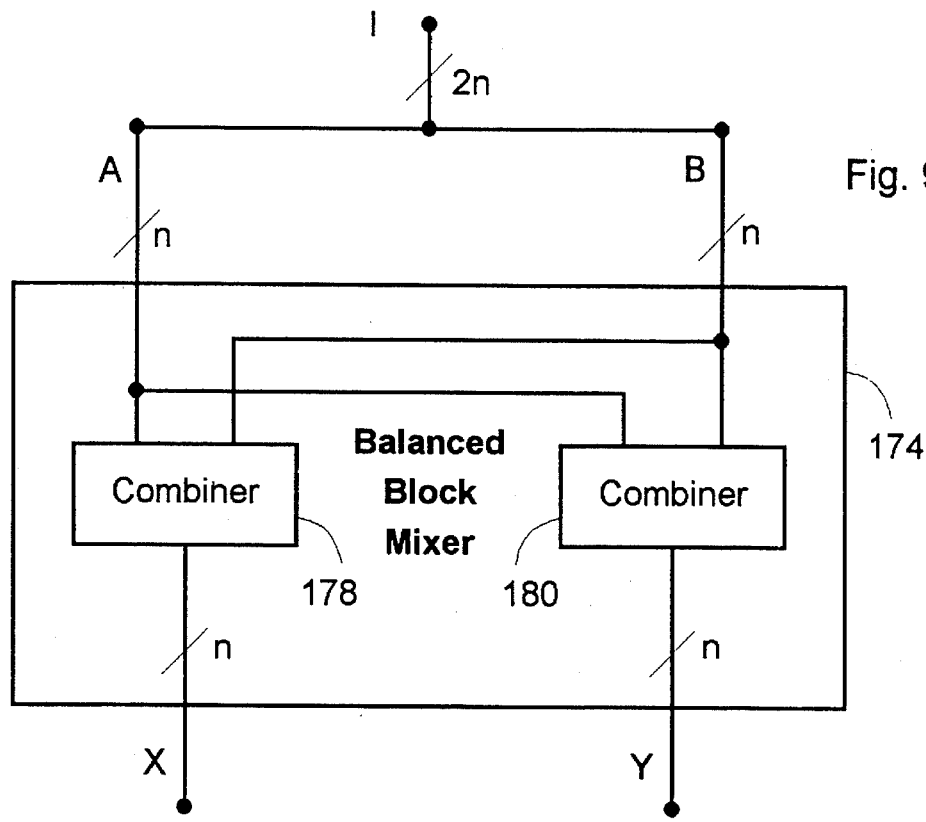
FIGS. 9(*a*) and 9(*b*) are schematic diagrams of balanced block mixers according to the present invention.
Figure 9B:
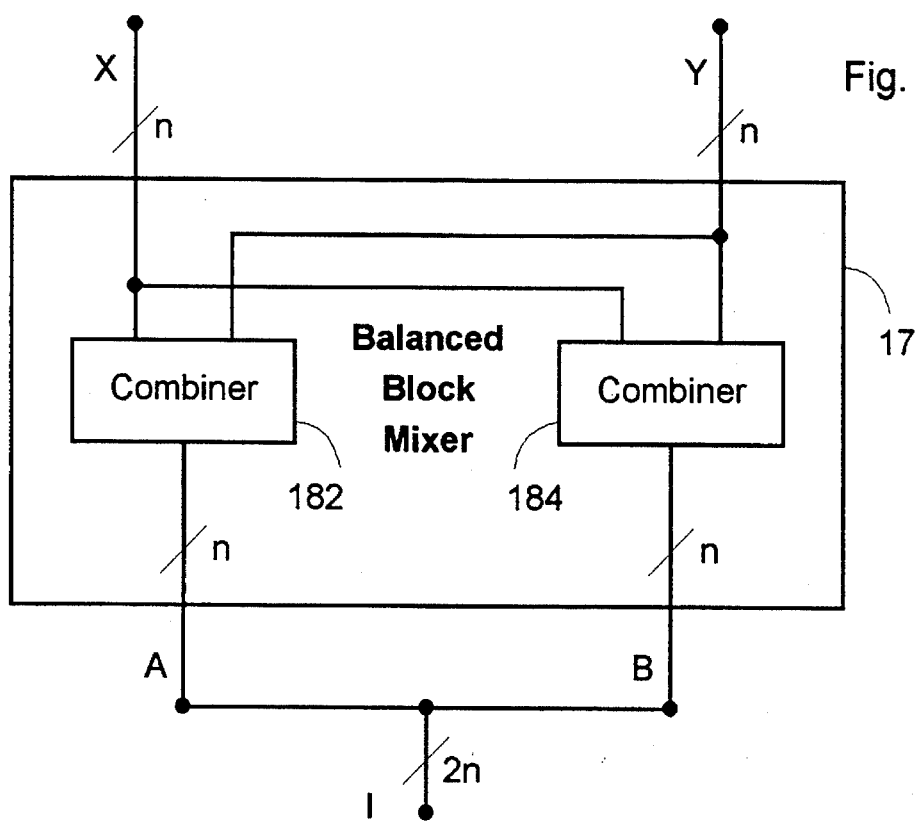

FIGS. 9(a) and 9(b) show the operations performed by balanced block mixers 174 and 176 in terms of their four component combiners 178-184. In the mechanisms of FIGS. 9(a) and 9(b), balanced block mixer 174 consists of combiners 178 and 180, and balanced block mixer 176 consists of combiners 182 and 184. A 2n-bit input message is split into two n-bit data blocks A and B which are input to balanced block mixer 174. Within the balanced block mixer 174, data blocks A and B are input to combiners 178 and 180. The two combiners 178 and 180 produce two n-bit output data blocks X and Y. Data blocks X and Y may then be further encrypted prior to transmission or use. FIG. 9(b) illustrates apparatus for recreating input message I from data blocks X and Y. Upon receipt of the data blocks X and Y (perhaps as a single 2n-bit data block), balanced block mixer 176 (the inverse of balanced block mixer 174) takes two n-bit input data blocks X and Y and uses two combiners 182 and 184 to produce two n-bit data blocks A and B which are joined to reproduce the original input message.

Desirably, a balanced block mixer has the following properties:

1. The mapping is one-to-one and invertible. That is, every possible input message to the mixer produces a different output, and every possible output from the mixer is produced by a different input message to the mixer.
2. Each output of a mixer is a function of all inputs to the mixer That is, treating the inputs and outputs to the mixer as values (e.g., binary values), every output value is a function of all input values. With reference to FIGS. 9(a) and 9(b), output blocks X and Y from balanced block mixer 174 are each functions of both input blocks A and B. That is, the outputs (X and Y) of balanced block mixer 174 are both a function of the entire input message I. Similarly, output blocks (A and B) of balanced block mixer 176 are both functions of both input blocks (X and Y).
3. Changes Propagate to All Outputs. Any change to any one of the input values to the mixer will change all of the output code values of the mixer. For example, with reference to FIGS. 9(a) and 9(b), a change to any value in input data block A to balanced block mixer 174 will cause a change in both output data blocks X and Y. Similarly, a change to any value in input data block B will cause a change in both output data blocks
4. Balance and Input Independence. Stepping any input to the mixer through all possible values (while keeping the other inputs fixed) will step every output of the mixer through all possible values. For example, with reference to FIGS. 9(a) and 9(b), keeping the value of input B fixed and changing the value of input A through all possible values will cause outputs X and Y to each step though all possible values.

In the preferred embodiments, balanced block mixers (performing block mixing transforms) are size preserving. That is, the size of the output blocks is the same as the size of the input blocks. With reference to FIGS. 9(a) and 9(b), the sizes of data blocks X and Y are the same as the sizes of data blocks A and B. Thus, for example, if the input message I is 128 bits and A and B are 64-bit data blocks then X and Y are also 64-bit data blocks.

Creating and Generating Balanced Block Mixers

Balanced block mixers with the above-described properties can be obtained using orthogonal Latin squares. Essentially a block mixing transform is implemented as two orthogonal Latin squares. Because the Latin squares are orthogonal, their accumulated output is reversible. The generation of orthogonal Latin squares is described in "The Completely Orthogonalized Latin Square," Stevens, W. L., *Annals of Eugenics*, 9: 82–93, 1939, which is hereby incorporated herein by reference. (A way of constructing orthogonal Latin Squares is also described in "Direct Construction of Mutually Orthogonal Latin Squares," Kull H. et al., *Computational Theory and Logic*, 1987.)

A Latin square is a two-dimensional array or matrix of symbols, such that each row and each column contains each symbol exactly once. A Latin square is used to mix two values by using one value to select a row of the square, and the other to select a column of the square, and then reporting the value of the Latin square at that row and column This Latin square mixing is balanced: for any particular value on one input, changing the other input produces every possible output symbol.

A known Latin square is invertible if one of the mixing inputs is known, which is the usual situation for a stream cipher.

The values from a pair of Latin squares can be transformed to their original values without outside information, provided the Latin squares are "orthogonal". That is, each pair of output symbols is produced by just a single selection of input values. (If two pairs of input values produce the same output values, then it cannot be determined which of those input pairs to choose when deciphering.) Note that two exclusive-OR functions are not orthogonal, and so cannot be used in this way.

Using a more formal notation, a Latin Square of order (size) m is an m×m square array of the symbols $S_0, S_1, \ldots, S_{m-1}$ such that each row and each column are a permutation of the symbols $S_0, S_1, \ldots, S_{m-1}$, and each symbol appears only once in each row and in each column (clearly the m symbols can be replaced by m digits). Thus, for example, when m is 3, the following is a Latin square:

| B | C | A |
|---|---|---|
| C | A | B |
| A | B | C |

Two Latin squares of the same size are said to be orthogonal to each other if, when the two squares are superimposed, each symbol of one square coincides exactly once with each symbol of the other square. For example, two Latin squares of size three with this property are:

| B | C | A | B | C | A |
|---|---|---|---|---|---|
| C | A | B | A | B | C |
| A | B | C | C | A | B |

When the above two Latin squares are superimposed (as shown below),

| (B,B) | (C,C) | (A,A) |
|-------|-------|-------|
| (C,A) | (A,B) | (B,C) |
| (A,C) | (B,A) | (C,B) | each possible ordered pair of symbols occurs exactly once.

First, one method of constructing a Latin square is described. The Latin square L of size m, having the digits {0, 1, ..., m−1} can be written as $L[x, y]=(kx+y)$ mod m, where k is a non-zero constant and x and y are in the range 0 to m−1. That is, "(kx +y) mod m" is the number to be placed in the xth row and the yth column of the square. For example, a value of m=3 gives the following Latin square (only for the sake of notation, we denote "a mod b" as "a|b" herein):

| 0 | 1 | 2 |
|---|---|---|
| k|3 | (k+1)|3 | (k+2)|3 |
| 2k|3 | (2k+1)|3 | (2k+2)|3 |

For k=1, this gives the Latin square

| 0 | 1 | 2 |
|---|---|---|
| 1 | 2 | 0 |
| 2 | 0 | 1 |

Construction of Orthogonal Latin Squares

The following construction derives from Stevens, cited above.

Assuming that a field of m numbers exists, a square S of the digits may be written as:

$S = \{u_k u_x + u_y\}$, where $u_k$ is a non-zero constant, and where $u_x, u_y = 0, 1, u_2, \ldots, u_{m-1}$, where $u_k u_x + u_y$ is the number in row $u_x$ and column $u_y$. The numbers may have no obvious order, but we may designate the m rows and columns by means of the numbers $0, 1, u_2, \ldots, u_{m-1}$ in any way. Stevens shows that any two squares defined as above, for different values of $u_k$, are orthogonal.

Clearly, for large values of n, the Latin squares of size $2^n$ are too large and unwieldy to be usefully generated and stored. However, since the method of generating the squares uses functions which can be easily computed, the actual Latin squares need not ever be generated. In other words, whenever a Latin square is referred to or needed, its generating function can be used.

One way to create a finite field is to use a prime number. For some prime number p, the values $0, 1, \ldots, p-1$, constitute a finite field modulo p. However, for efficient computer implementation, we would like to have a field of exactly $2^n$ elements, and 2 is not prime for n above 1. We might use primes close to $2^n$ provided that we can accept some unbalance, or we can use polynomial operations, as discussed below. Polynomial operations modulo an irreducible polynomial provide a way to generate fields of exactly $2^n$ elements with exact balance and with efficient operation.

Given a Latin square LS of size m having as elements the numbers $0, 1, \ldots, m-1$, if a particular row value is fixed at say A, the value of LS[A, c] will take on all values in $\{0, 1, \ldots, m-1\}$ as c varies over all possible values $0, 1, \ldots, m-1$. Similarly, if a particular column is fixed at say B, the value of LS[r, B] will take on all values in $\{0, 1, \ldots, m-1\}$ as r varies over all possible values $0, 1, \ldots, m-1$. This corresponds to desired property number 4 for balanced block mixers, listed above.

Notes on Polynomial Arithmetic

A polynomial over S is an expression of the form $$u(x) = u_n x^n + \ldots u_1 x + u_0,$$

where the coefficients $u_i$ are elements of some algebraic system S, and the variable x may be regarded as a formal symbol with an indeterminate meaning.

The algebraic system S is usually the set of integers, or the rational numbers. When S is the set of integers $\{0, 1, \ldots, m-1\}$, with addition, subtraction, and multiplication performed mod m, this is called polynomial arithmetic modulo m (or mod m).

Thus, a mod p polynomial P is one of the form:

$$P(x) = p_n x^n + \ldots p_1 x + p_0$$

where the coefficients p are integers in $\{0, 1, \ldots, p-1\}$ and the addition, subtraction and multiplication are performed mod p. A mod 2 polynomial P has all coefficients 0 or 1 and the addition, subtraction and multiplication are performed mod 2.

Notes on Fields

Definitions of mathematical fields can be found in most basic books on number theory. Some definitions are included here (from Koblitz, *A Course in Number Theory and Cryptography*, 2nd Edition, Springer-Verlag, 1994).

A field is a set with multiplication and addition operations which are associative, commutative and distributive. The set has an additive identity (zero), a multiplicative identity (one), additive inverses and multiplicative inverses for everything except zero. For example, the set of all real numbers, R, is a field and the set of integers modulo a prime number is a field.

The notion of a field extends to polynomials. As with integer fields (modulo some prime number), polynomial fields are described modulo a prime (irreducible) polynomial. For example, if P is a polynomial field modulo the prime polynomial p, we refer to P as a modulo p (or mod p) field. This essentially means that all arithmetic on polynomials in the field is performed modulo the prime polynomial p.

Polynomials being "mod 2, mod p" (as used herein) means that each polynomial is a mod 2 polynomial (i.e., has coefficients that are 0 or 1) and that the arithmetic over the polynomials is performed modulo p.

Examples of Balanced Block Mixers

The following combiners, with their operations performed modulo 2 and modulo p, for some irreducible mod 2 polynomial p of appropriate degree for the data blocks X, Y, A and B (polynomial p need not be primitive, but must be irreducible to generate a field), provide an example of a balanced block mixers for balanced block mixer 174 and its inverse balanced block mixer 176 of FIGS. 9(a) and 9(b):

Combiner$_{178}$(A, B) = 3A + 2B,

Combiner$_{180}$(A, B) = 2A + 3B,

Combiner$_{182}$(X, Y) = 3X + 2Y,

Combiner$_{184}$(X, Y) = 2X + 3Y.

Each input value to a balanced block mixer is a binary number which corresponds to the coefficients of a mod 2 polynomial. So, in the above example, A, B, X, and Y are each considered as mod 2 polynomials. Then, the operations performed by the combiners, e.g., 2A+3B, etc., are first performed as mod 2 polynomials, and those results are reduced mod p (i.e., modulo the irreducible polynomial p). So, for example, "2A+3B" above could also be written as "(2A+3B) mod p".

The data transform performed by the balanced block mixers shown above is a self-inverse, has good mixing correlation properties, is statistically balanced, and has a processing cost which is linear with block size.

Using the data or signal transformation X=Combiner(A, B)=3A+2B; Y=Combiner(A, B)=2A+3B, in a balanced block mixer, any value change to either of the input signals A or B must be reflected in both the X and Y output signals. Suppose, for example, that some change C is made to the input signal A:

X = 3A + 2B (mod 2, mod p)

X' = 3(A+C) + 2B

X' = 3A + 3C + 2B dX = X' − X = 3C but 3C is non-zero (thus affecting the output signal) for any signal change C which is not zero, and if C is zero, there has been no change to the input signal A. Suppose some change C is made to input signal B:

X = 3A + 2B (mod 2, mod p)

X' = 3A + 2(B+C)

X' = 3A + 2B + 2C dX=X'−X=2C

Similarly, 2C is also non-zero for any signal change C which is not zero.

Suppose that the signal change C is made half the value of p plus the highest bit $2^{deg(p)-1}$, so that p will be activated in the process of determining the output signal and 2C will cancel the lower bits of p. Since p is irreducible there is no q such that 2q=p. Similar arguments apply for Y=2A+3B.

A present embodiment of the invention uses the degree-128 irreducible 01000040000004002000020000004000001 (hex), and the degree-64 irreducible 010002000000800201 as block mixing polynomials. Polynomials with about half the number of possible terms would be desirable some implementations.

With reference to FIGS. 9(a) and 9(b), and the above combiners, a 2n-bit input message signal I is split into two n-bit data blocks A and B which are input to balanced block mixer 174. Within balanced block mixer 174, data blocks A and B are each input to combiners 178 and 180. Combiner 178 takes the two input data blocks A and B and produces an output data block X (which is 3A+2B mod 2, mod p). Combiner 180 takes the same two input blocks A and B and produces an output data block Y (which is 2A+3B mod 2, mod p).

Upon receipt, data blocks X and Y are input to inverse balanced block mixer 176 where each data block is input to combiners 182 and 184. Combiner 182 takes its two input data blocks X and Y and produces a data block 3X+2Y mod 2, mod p, i.e., data block A. Combiner 184 takes its two input data blocks X and Y and produces a data block 2X+3Y mod 2, mod p, i.e., data block B.

Fenced Cryptographic Mechanisms

A fenced cryptographic mechanism is a cryptographic mechanism 100 (FIG. 1) that uses a cipher mechanism as a component in a cryptographic mechanism which is at least as powerful and potentially stronger than the cipher mechanism, yet almost as fast. For example, a fenced DES mechanism uses the DES cipher mechanism as a component and a fenced IDEA mechanism uses the IDEA cipher mechanism as a component.

A core component mechanism of a fenced cryptographic mechanism is a substitution mechanism described below.

A 1× fenced cipher mechanism

Figure 10:
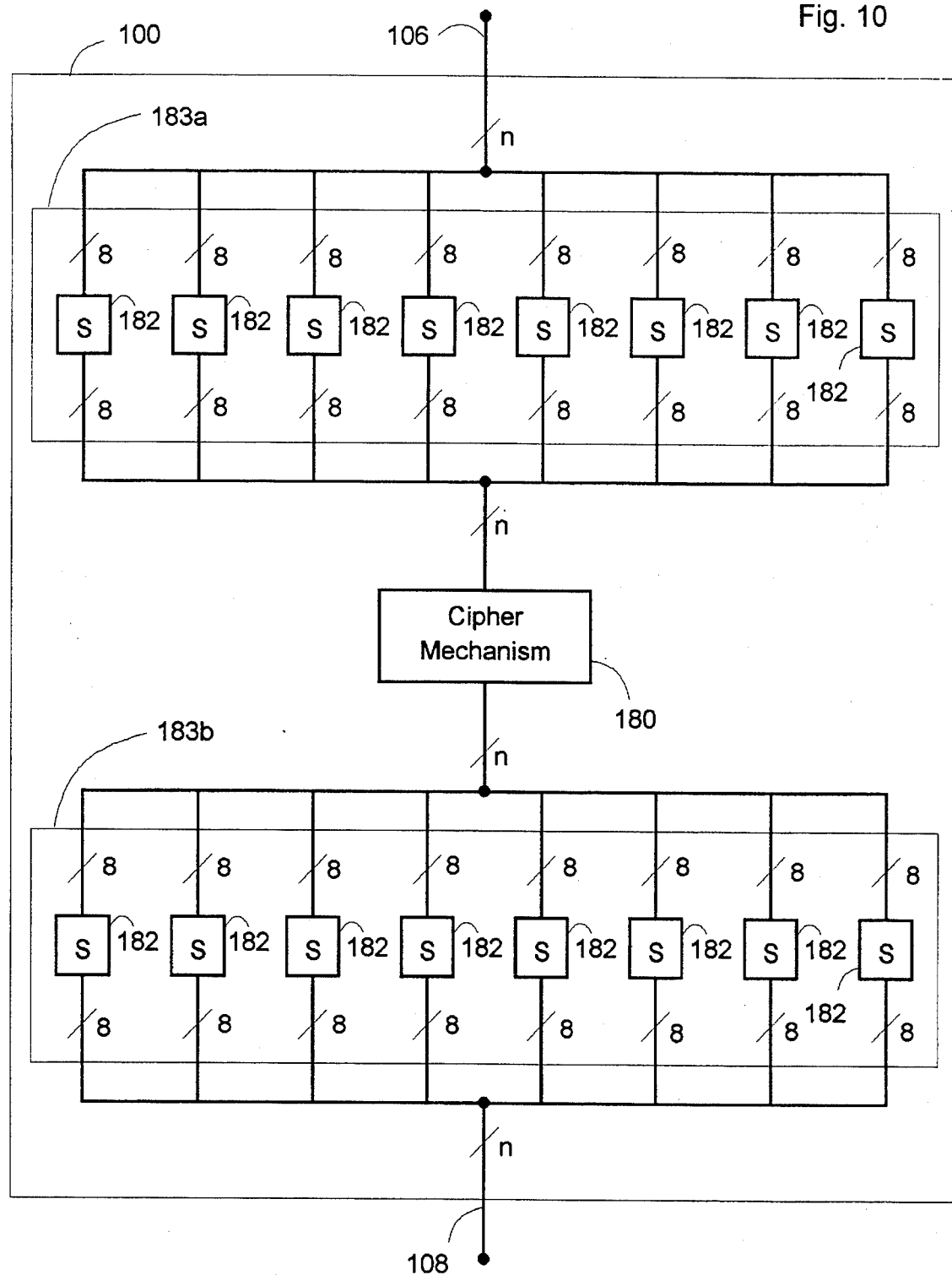
FIG. 10 is a schematic diagram of a cryptographic mechanism employing substitution mechanisms according to the present invention.

With reference to FIG. 10, an embodiment of the present invention being cryptographic mechanism 100 in the form of a 1× fenced cipher mechanism for an n-bit cipher mechanism 180 is shown. (The term "fenced" is used to describe the "picket fence" appearance of the arrays 183a, 183b of substitution mechanisms 182 (S-mechanisms or S-devices herein) surrounding the cipher mechanism 180 in the schematic diagrams.) Each of substitution mechanisms 182 performs an eight-bit wide (256-byte) substitution randomized under the control of a cryptographic key. (The randomization is described below.) Therefore, for an n-bit cryptographic mechanism, two arrays of n/8 substitution mechanisms 182 are needed, one array on each side of the cipher mechanism 180, for a total of n/4 substitution mechanisms 182. For example, if the cipher mechanism 180 is a DES mechanism or an IDEA mechanism (with a 64-bit input block), then one array 183a, 183b of eight (8) substitution mechanisms 182 is used on either side of the cipher mechanism 180.

In operation, a fenced cryptographic mechanism 100 receives an n-bit signal I which is split into n/8 8-bit components, each of which is passed through a substitution mechanism 182 in the array 183a of substitution mechanisms. The combined output of the array 183a of substitution mechanisms 182 is an n-bit data value which is then input to cipher mechanism 180 for ciphering. The output of cipher mechanism 180 is an n-bit ciphered message which is then passed (in 8-bit components) through another array 183b of n/8 substitution mechanisms 182 to produce an n-bit plaintext signal.

Functionally, the cryptographic mechanism 100 in FIG. 10 can be written as:

for each $x_i$, i = 1 to n/8,
  $S_i(x_i) \to x'_i$
CIPHER($x'_1 x'_2 \ldots x'_{n/8}$, k) $\to y_1 y_2 \ldots y_{n/8}$
for each $y_i$, i = 1 to n/8,
  $S_{n/8+i}(y_i) \to y'_i$ Substitution Mechanisms The fenced cryptographic mechanisms use, in combination with other elements, substitution mechanisms. Substitution mechanisms essentially implement keyed substitution tables which can be initialized before ciphering, and left unchanged during ciphering or which can change during ciphering. The substitution mechanisms operate by transforming one k-bit input value into another k-bit output value using a substitution table of size $2^k$. In the preferred embodiments described herein, the value of k is eight, and the substitution mechanisms effectively have tables with $2^8$=256 entries. However, other values of k could be used.

Figure 11:
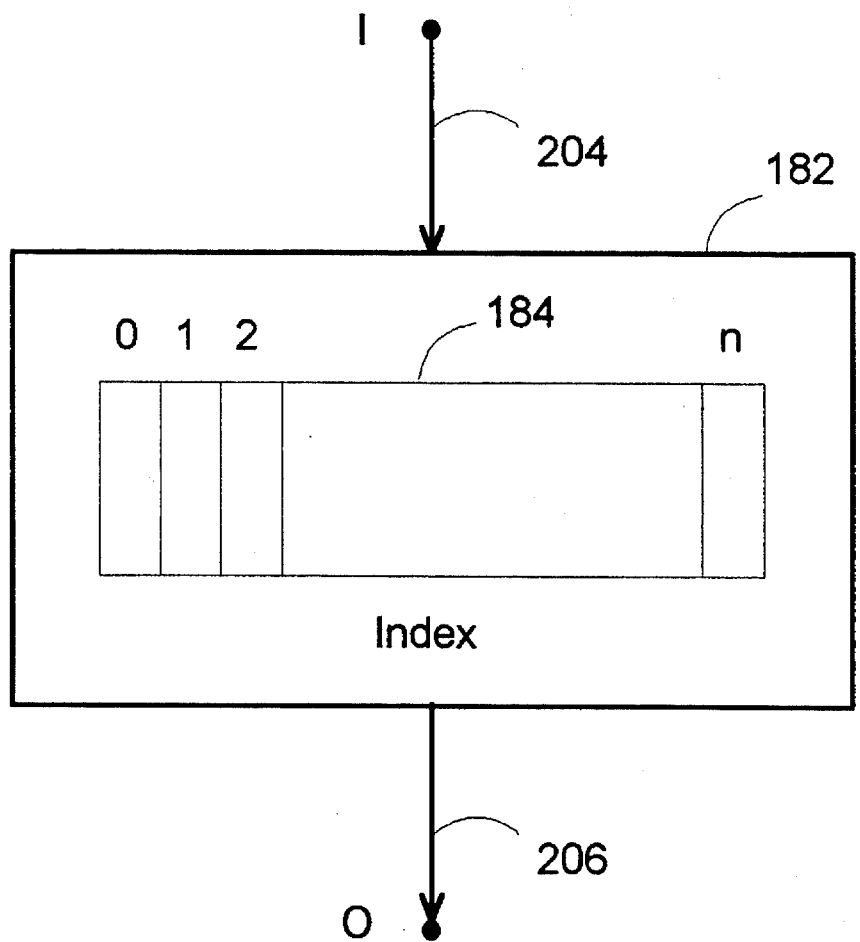
FIG. 11 is a schematic diagram of a substitution mechanism according to the present invention.

FIG. 11 shows a single substitution mechanism 182 in detail. Input data I to substitution mechanism 182 is transformed by the substitution mechanism 182 to output data O. The input data I is an index into substitution table or array 184, and selects one of the entries in the table. The value stored in the selected entry forms the output data 0. A substitution table S is an indexable n-element vector of output codes or values. Essentially a substitution table is a memory device which stores values which can be selected by address or index value.

In cryptographic service, substitution tables are often initialized to contain exactly one occurrence of each possible index value, thus making the transformation they perform invertible. The arrangement of values in the substitution table can be controlled by a cryptographic key. Such a properly-initialized device (or area of memory) is called a substitution mechanism.

For each substitution mechanism, the inverse mechanism can be formed by properly arranging the data in another substitution mechanism. Thus, in substitution mechanism 182, if input I maps to output 0, then in the inverse substitution mechanism, input 0 maps to output I.

The substitution mechanisms perform a one-to-one mapping of input values to output values, so that no two inputs will produce the same output, and no two outputs can derive from the same input.

Throughout this application, including the claims, the term "substitution mechanism" is intended to include all possible implementations (such as electronic hardware, computer implemented software, hybrids, or the like) or the process performed. Thus a substitution mechanism refers to either a substitution process or any implementation (for example, hardware, computer implemented software, hybrid, or the like) for performing the substitution process.

1× Fenced DES

With reference to FIG. 10, if the cipher mechanism 180 is a DES mechanism, then FIG. 10 depicts a 1× fenced DES mechanism in which a 64-bit input message block X is divided into eight message sub-blocks $x_1 x_2 \ldots x_8$, where each $x_i$ is an 8-bit sub-block of X. Each of the blocks $x_i$ is transformed via a corresponding substitution mechanism 182, $S_i$, to produce an 8-bit value $x'_i$. The eight 8-bit data values $x'_i$ as a 64-bit data block to DES mechanism 180, which, using key k, produces a 64-bit output data block Y made up of 8-bit sub-blocks $y_1 y_2 \ldots Y_8$. Each of the 8-bit data sub-blocks $y_i$ is transformed by a substitution block to an 8-bit data block $y'_1$. The output of the mechanism is then formed by joining or concatenating the eight $y'_i$ sub-blocks to form a 64-bit ciphertext message Y'.

If cipher mechanism 180 is a DES cipher mechanism, then functionally, the mechanism in FIG. 10 can be written as:

$$\text{for each } x_i, i = 1 \text{ to } 8,$$
$$S_i(x_i) \rightarrow x'_i$$
$$\text{DES ENCIPHER}(x'_1 x'_2 \ldots x'_8, k) \rightarrow y_1 y_2 \ldots y_8$$
$$\text{for each } y_i, i = 1 \text{ to } 8,$$
$$S_{8+i}(y_i) \rightarrow y'_i$$

Decryption of the message encrypted as above operates by first inverting what were the last substitutions performed by the substitution mechanisms 182, then deciphering the message with the cipher mechanism 180 (e.g., a DES mechanism), and then inverting what were the first round of substitutions.

Functionally, decryption of a message encrypted by the mechanism shown in FIG. 10 can be written as:

$$\text{for each } y'_i, i = 1 \text{ to } n/8,$$
$$S\text{-inverse}_{n/8+i}(y'_i) \rightarrow y_i$$
$$\text{DECIPHER}(y_1 y_2 \ldots y_{n/8}, k) \rightarrow x_1' x_2' \ldots x_{n/8}'$$
$$\text{for each } x_i', i = 1 \text{ to } n/8,$$
$$S\text{-inverse}_i(x_i') \rightarrow x_i$$

A 1× Fenced DES is a three-layer structure like triple DES. Since all information flows through DES itself, the overall cipher cannot possibly be weaker than DES. Moreover, the 1× Fenced DES structure is clearly stronger than DES, because a "known plaintext" attack requires knowing the actual input and output values at the DES cipher itself, and these values are hidden by the input and output substitution layers. If even a single input bit to DES is wrong (that is, if even one value in one input substitution is off by even one bit), DES will avalanche and about half of the output bits from DES will be wrong.

The extreme sensitivity of good block ciphers to change—a tiny change in the input (plaintext) value tends to change about half of the output bits—is known as avalanche. In the context of an iterated product cipher (such as DES) which has multiple rounds, a small input change will affect a few adjacent bits each round, until, eventually, about half of the output bits change. Avalanche is a requirement in a good block cipher, and is an inherent property of a normal invertible substitution—any change to the input value of an invertible substitution selects a new and necessarily different output value.

Thus, a single wrong bit has the same statistical effect as a mostly-wrong value; this means that it is not possible to know when the input value is "close," so it does not appear possible to solve the substitutions in an advantageous way.

Figure 12:
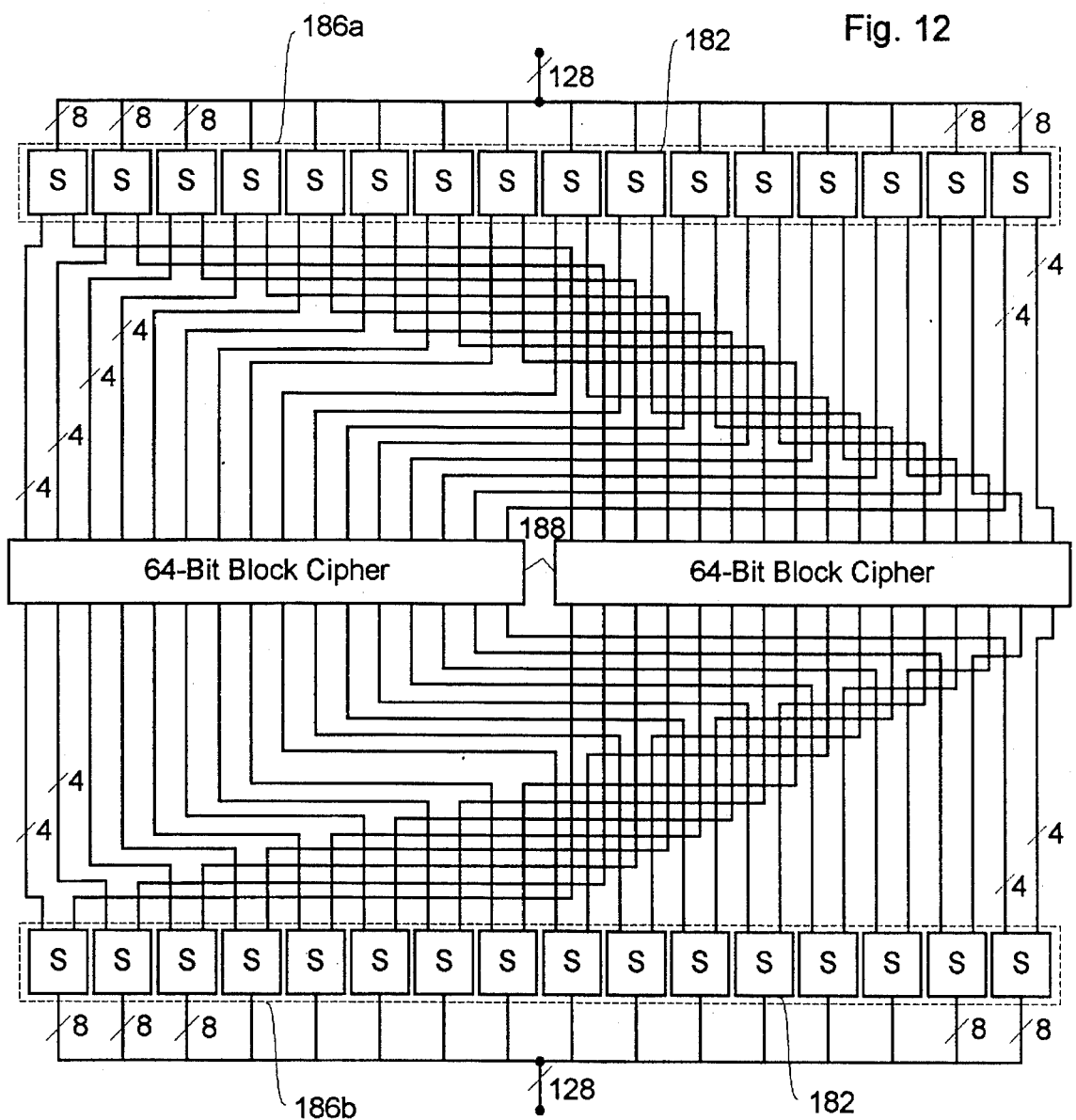
FIGS. 12–17 are schematic diagrams of cryptographic mechanisms employing substitution mechanisms according to the present invention.

In some preferred embodiments, as shown, for example, in the cryptographic mechanism of FIG. 12, arrays of substitution mechanisms are used to fence multiple parallel block cipher mechanisms. In the cryptographic mechanism 100 of FIG. 12, an array 186a of sixteen 8-bit substitution mechanisms 182 (each labelled "S" in the drawing) takes a 128-bit input signal into two 64-bit cipher mechanisms 188. The output of the cipher mechanisms 188 is passed through another array 186b of sixteen 8-bit substitution mechanisms.

Note that half the output of each substitution mechanism 182 is input to each of the two cipher mechanisms 188. In this manner, the output from each substitution mechanism 182 affects the output of each cipher mechanism 188. Thus, for an 8-bit substitution mechanism 182, up to eight cipher mechanisms 188 can be used in this configuration, with one bit of output from each substitution mechanism 182 going into each of the eight cipher mechanisms 188. In general, b-bit substitution mechanisms 182 can be used with up to b n-bit cipher mechanisms to produce an b.n-bit cryptographic mechanism 100.

Generating Keys for the Substitution Mechanisms

In order to enhance the strength of a cipher mechanism in a fenced cryptographic mechanism, each substitution mechanism must be shuffled by a cryptographic random number generator before ciphering begins (the random number generator is not needed during actual ciphering). The same random number generator can also generate the cipher keys.

Presently, the most efficient basis for such a random number generator is the additive random number generator described in Knuth, *The Art of Programming: Vol 2: Seminumerical Algorithms*, 2d Edition, Addison-Wesley, 1981. This is basically a linear feedback shift register (LFSR) using addition mod $2^n$. The additive random number generator is especially suited to a fast software implementation. In one version, there are three pointers into a circular queue, and the random number generator "step" operation consists of taking two of the pointed-to elements, adding them, and placing the result in the queue through the third pointer. The pointers are then incremented within the queue, and the result returned.

A reasonable structure for the Fenced DES random number generator is thirty-one (31) elements of thirty-two (32) bits each, for a total state of 992 bits. (DES has a 56-bit key.) This state can be initialized easily from a user key using an array of thirty-two (32) degree thirty-one (31) primitive mod-2 polynomials as cyclic redundancy checks (CRC's). This produces thirty-two (32) 31-bit values which can be re-arranged into thirty-one (31) 32-bit values to become the state for the random number generator. This CRC-based initialization allows the user key to be ASCII or binary, of arbitrary length, and thus provides a strong universal key interface.

Since the additive random number generator is essentially a linear mechanism, it is necessary to nonlinearize the sequence. One way to do this, mentioned in Ritter, "The Efficient Generation of Cryptographic Confusion Sequences," *Cryptologia*, 15(2): 81–139, 1991, by dropping out pseudo-random length sections of the linear sequence, leaving pseudo-random length "take" islands, and then offsetting each take sequence with a different pseudo-random offset value. With fairly short "take" islands, this renders the usual linear attacks worthless, at a cost of dropping some moderate fraction of the sequence. Additional isolation is provided by the cheap width of the random number generator, since only eight bits are needed, but thirty-two bits are calculated. This means that ¾ of the random number generator state is always hidden, but must nevertheless be resolved before the random number generator can be completely exposed.

Increased Block Size Fenced Cryptographic Mechanisms Using Balanced Block Mixers and Substitution Mechanisms In some embodiments of cryptographic mechanisms 100, combinations of substitution mechanisms and balanced block mixers are used. These can be used alone or in combination with other ciphers, and using these mechanisms, the block size of other ciphers can be increased.

2× Fenced Block Cipher Mechanisms

Figure 13:
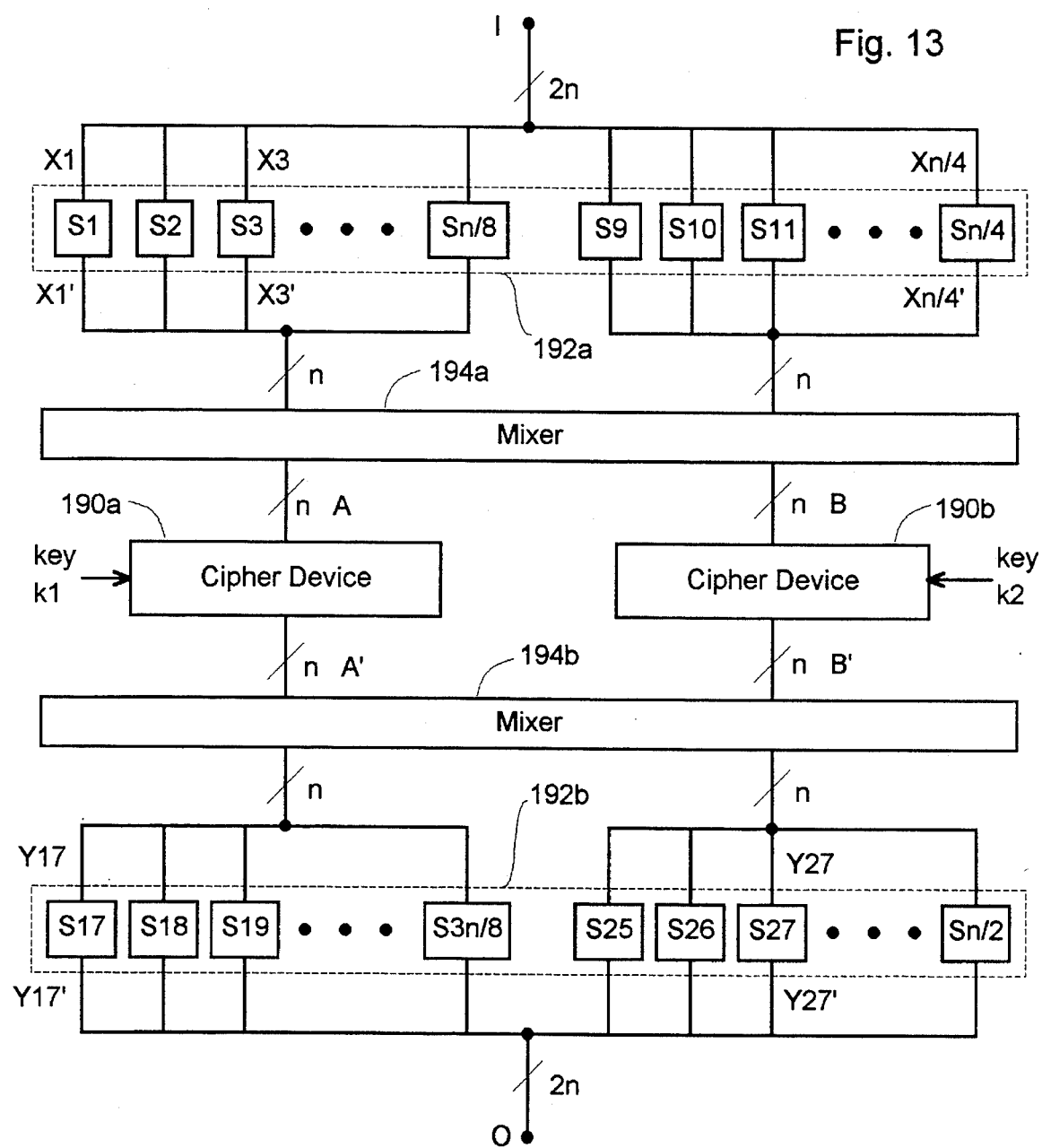

In one embodiment, with a combination of substitution mechanisms and balanced block mixers, the block size n of a cipher mechanism can be doubled. (In the following, only for the sake of generality, it is assumed that n is an integer power of 2.) With reference to FIG. 13, a 2× fenced block cryptographic mechanism consists of two keyed cipher mechanisms 190a, 190b, each taking n-bit blocks, n/2 substitution mechanisms.(labelled $S_1$ to $S_{n/2}$) in two arrays 192a, 192b, and two balanced block mixers 194a, 194b. A 2n-bit input signal I is split into n/4 8-bit parts $X_1, \ldots, X_{n/4}$ (as with the other signal splitting described herein, this splitting can be done merely based on the order of the bits in the input message, or some complex form of splitting can be used). Each 8-bit part $X_i$ is passed through an array of substitution mechanism $S_i$, i=1, . . . , n/4, producing a substituted 8-bit data part $X_i'$. The n/4 8-bit data parts $X_i'$ are input to balanced block mixer 194a which produces two n-bit data blocks A and B. Data block A is encrypted by cipher mechanism 190a to produced n-bit enciphered block A', and data block B is encrypted by cipher mechanism 190b to produced n-bit enciphered block B'. Data blocks A' and B' are input to a second balanced block mixer 194b which produces balanced mixed output blocks. The output blocks are split into n/4 8-bit parts, each of which is passed through a substitution mechanism $S_j$, j=n/4+1, . . . , n/2, to produce n/4 substituted 8-bit data blocks $y_j$. The n/4 8-bit data blocks $y_j$ are joined to form a 2n-bit ciphertext output signal.

2× Fenced DES

Where the cipher mechanisms 190a and 190b are DES mechanisms, n is 64 bits. In this case, using a combination of substitution mechanisms and balanced block mixers, the effective block size of DES can be doubled. With reference to FIG. 13, two balanced block mixers 194a and 194b are used to produce two 64-bit inputs to DES mechanisms 190a, 190b from a 128-bit input message signal. The first array 192a of substitution mechanisms $S_1$–$S_{16}$ map sixteen 8-bit inputs to 8-bit outputs, as described above. The input signal to the system is a 128-bit block, split into sixteen 8-bit blocks, $x_1$–$x_{16}$. Each of these sixteen blocks is transformed via a corresponding substitution mechanism. That is, for i from 1 to 16, 8-bit data block $x_i$ is transformed by substitution mechanism $S_i$, to give 8-bit data block $x'_i$. Eight of the transformed 8-bit blocks are input (as a 64-bit block A) to one DES mechanism 190a, and the other eight 8-bit blocks are input (as 64-bit block B) to the other DES mechanism 190b. Data blocks A and B are encrypted to produce to 64-bit output blocks A' and B', where, functionally, A'=DES(A, $k_1$) and B'=DES(B, $k_2$). As above, keys $k_1$, and $k_2$ can be the same as each other or different. Data blocks A' and B' are mixed using balanced block mixer 194b, and the output 128-bits (as two 64-bit blocks) are then transformed (in 8-bit blocks) by array 192b of substitution mechanisms $S_{17}$–$S_{32}$ to produce 128-bit output ciphertext message signal O=$y_{17}'y_{18}' \ldots y_{32}'$.

A ciphertext message signal O produced by an encryption mechanism as described is decrypted as follows. The signal is split back into its 8-bit component parts $y_i'$ which are then passed through substitution mechanisms S-inverses$_{17}$ to S-inverse (which perform the inverse transformations of $S_{17}$ to $S_{32}$, respectively), giving back the 8-bit data blocks $y_{17}$ to $y_{32}$. The 8-bit data blocks $y_1$ to $y_{17}$ are passed through the inverse of balanced block mixer 194b, giving two 64-bit data blocks A' and B'. Data blocks A' and B' are decrypted by DES mechanisms 190a, 190b with the appropriate keys, giving 64-bit data blocks A and B, respectively. Data blocks A and B are passed through the inverse of balanced block mixer 194a to give outputs $X_i'$40 which are transformed by substitution mechanisms $S_i$-inverse (which performs the inverse transformation of substitution mechanism S), for i from 1 to 16. The output of the inverse substitutions forms a 128-bit plaintext message signal.

4× Fenced Block Cipher Mechanisms

Figure 14:
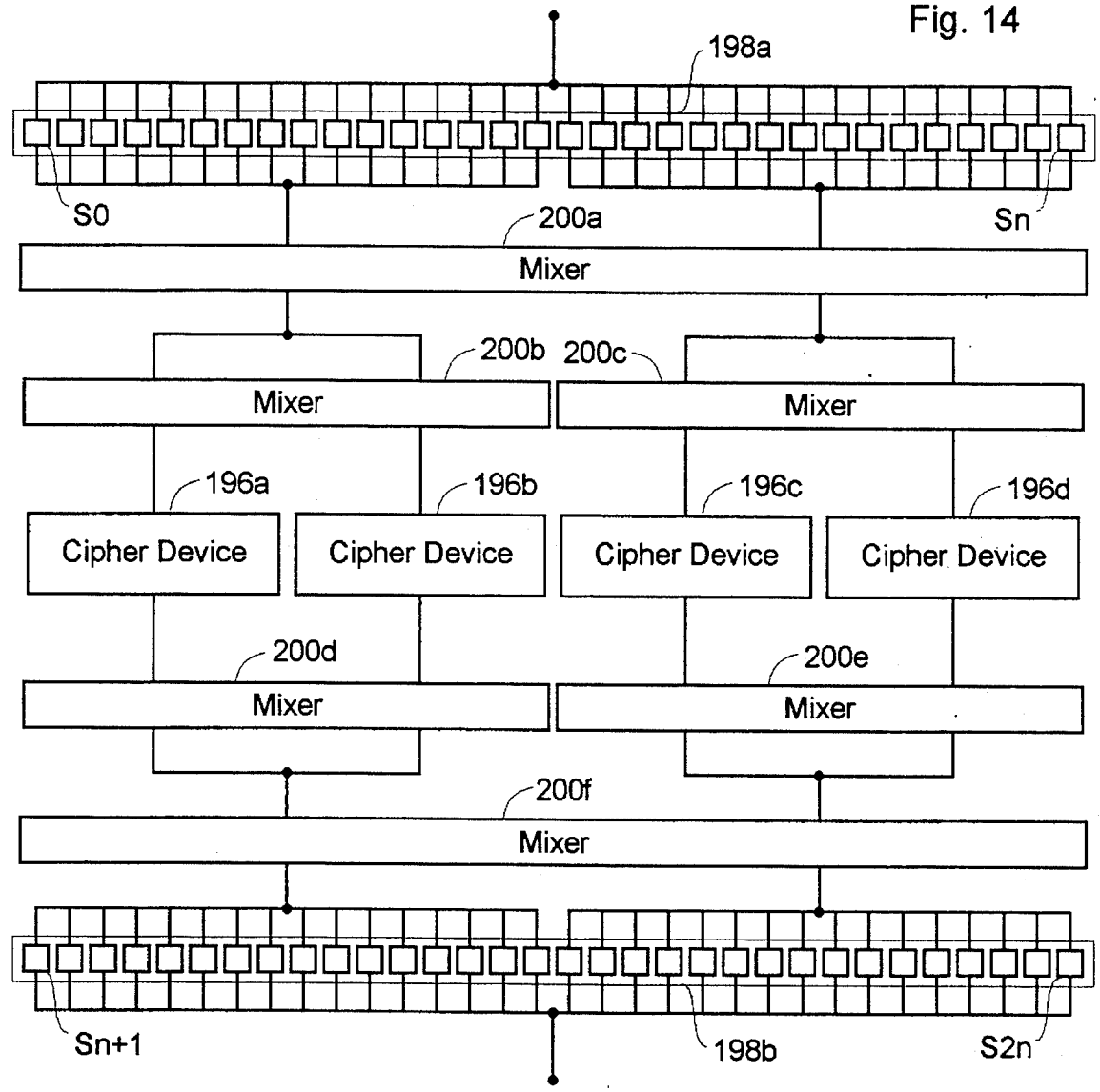

In one embodiment of the present invention, with a combination of substitution blocks and block mixers, the block size of a cipher is quadrupled. With reference to FIG. 14, a 4× fenced block cryptographic mechanism consists of four keyed cipher mechanisms 196a–196d, each processing n-bit data blocks to produce an n-bit data block, 2n substitution mechanisms (labelled $S_1$ to $S_{2n}$) in two arrays 198a, 198b, and six balanced block mixers 200a–200f. The corresponding decryption mechanism uses the inverse substitutions and the inverse mixers, in the appropriate order.

4× Fenced DES

Where cipher mechanisms 196a–196d are DES cipher mechanisms, the encryption illustrated in FIG. 14 processes a 256-bit input message block.

Here there are two arrays 198a, 198b of thirty-two (32) 8-bit input substitution mechanisms $S_1$ to $S_{32}$ and thirty-two (32) 8-bit output substitution mechanisms $S_{33}$ to $S_{65}$, respectively, each substitution mechanism effectively a separately-shuffled and independent substitution table. The overall block size of the cryptographic mechanism is 256 bits, there are four DES mechanisms, plus two levels of input mixing (by mixers 200a–200c) and two levels of output mixing (by mixers 200d–200f). Note that the outermost balanced block mixers join two 128-bit blocks.

This approach spreads the effect of each bit in an input message to each of the four DES mechanisms, and produces a particular output bit from a combination of all four DES mechanisms. This forces an opponent (trying to break the code) to search all four DES keyspaces simultaneously to match a particular known plaintext-ciphertext pair.

While in the above, the substitution mechanisms are effectively 8-bit substitution tables, a different size could be used for these mechanisms.

A software implementation of the 4× DES construct of FIG. 14 performs all sixty-four substitutions and all six mixings in less time than a single DES computation. Currently, it ciphers four times the data with about 4.8 times the computation, and has a keyspace exceeding 224 bits. (A much faster hybrid implementation might perform the DES computations in hardware.)

In the implementation, table and key initialization take about 182 times the computation of a single 256-bit block ciphering. (This is mainly a consequence of shuffling sixty-four small substitution tables, an initialization which could be separated from the use of new DES mechanism keys. Table initialization can occur less frequently than key initialization.)

The current implementation uses a fast 992-bit additive random number generator and a non-linear "jitterizer" as mentioned in Ritter. In the present implementation, a user key of arbitrary length and content is hashed by thirty-two (32) separate degree-31 primitive mod-2 polynomials with 11–19 non-zero terms, producing the 992-bit random number generator state, which also eventually generates the DES keys. This approach eliminates the need for keys to have a specific format unique to this particular cipher, which enables the selection of an arbitrary cipher from among many different ciphers, all of which can use the exact same key.

Deciphering simply uses inverse substitutions (the inverse of each encipher output substitution is used for decipher input) and DES in decipher mode.

Recall that a change in any one input data bit produces a distribution of changes out of the associated input substitution, depending on the particular substitution, original input value, and change. Any possible byte input has a 50 percent probability of affecting each of the eight output bits from that substitution.

Each substitution mechanism used in the fenced mechanisms effectively implements a substitution table. A substitution table S is an indexable n-element vector of output codes. An invertible substitution table S with inverse table $S^{-1}$ has the property that for any input code i ∈n, $S^{-1}S(i)=i$. This implies that S contains n different output codes.

An invertible substitution table S contains each output code value exactly once. Since each possible index selects a different element, any index change will select a different output code. Since different code values must differ in at least one bit, any input change must produce a change in at least one output bit.

Given invertible substitution table S with shuffled contents, the output distribution for any input code change is an arbitrary selection from the output codes which differ from the current output code. If the output codes are a complete set of $2^m$ values $0 \ldots 2^{m-1}$ for some m, it is likely that about half of the output bits will change for any input code change.

Conversely, since each output bit is produced by an output code, and the selected output code is completely dependent upon every bit in the input code, each output bit is dependent on every bit of the input. A network with this property is normally called complete, and localized completeness is also the basis for avalanche in an iterated block cipher.

If two 128-bit blocks are first mixed, then the resulting data mixed as two pairs of 64-bit blocks, suppose that there is a change in any one input data bit. Without the mixing, this produces an 8-bit substituted result which would normally affect just a single DES block. But the 128-bit block mixing produces at least one bit change in both 128-bit resulting blocks, and the 64-bit block mixings extend those changes to all four 64-bit resulting blocks, each of which is processed by a separate DES mechanism. Thus, any change of even a single input bit will affect all four DES operations.

Even though the output from each DES operation is pseudo random, a three-level structure is still necessary to prevent various kinds of attacks, for example, so-called "fix-in-the-middle" attacks. Therefore the output substitutions are important. The mixing is also used so that the result from a single DES block cannot be isolated and worked on independently.

Some Other Fenced Block Cipher Mechanisms

Figure 15A:
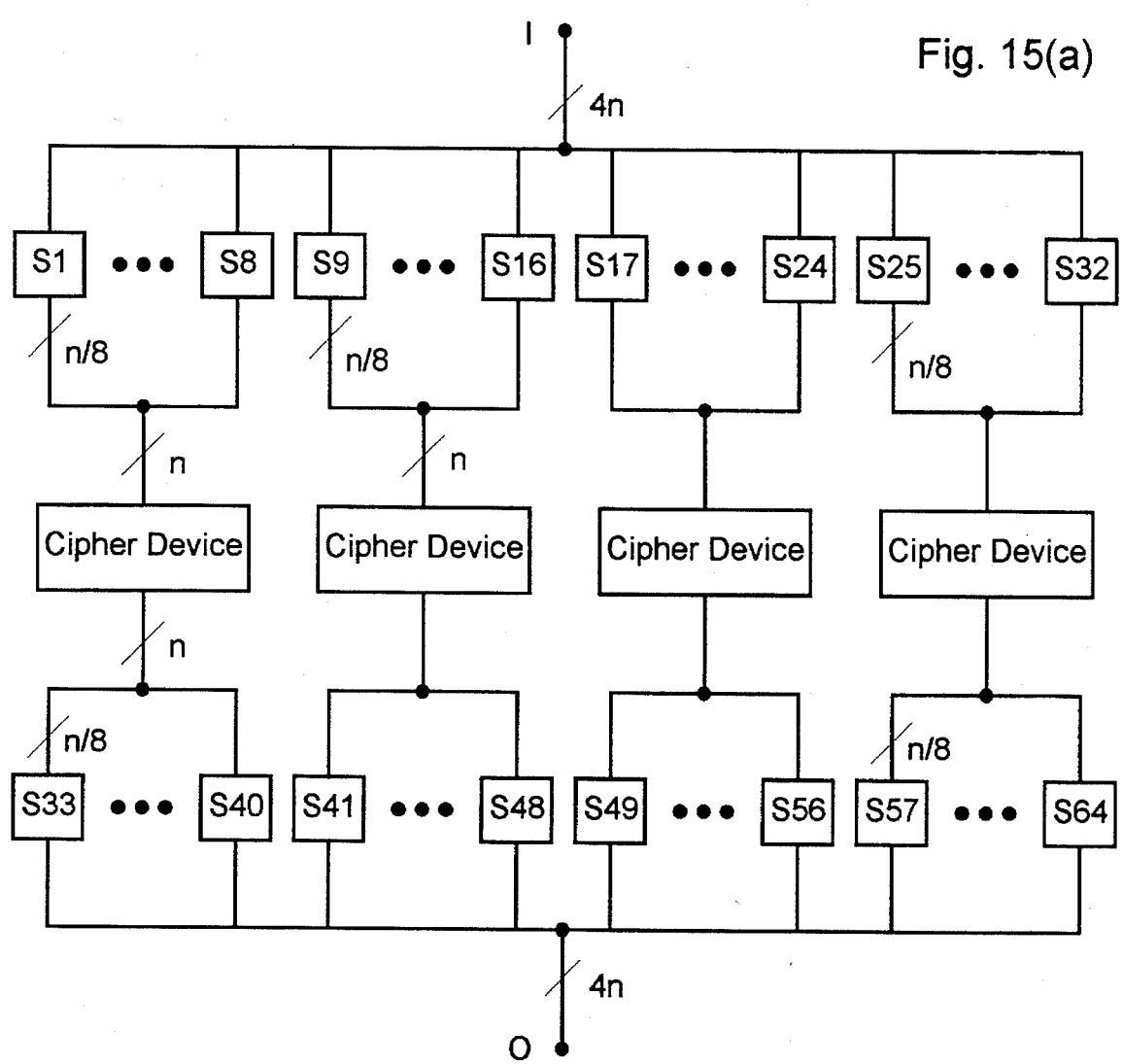
Figure 15B:
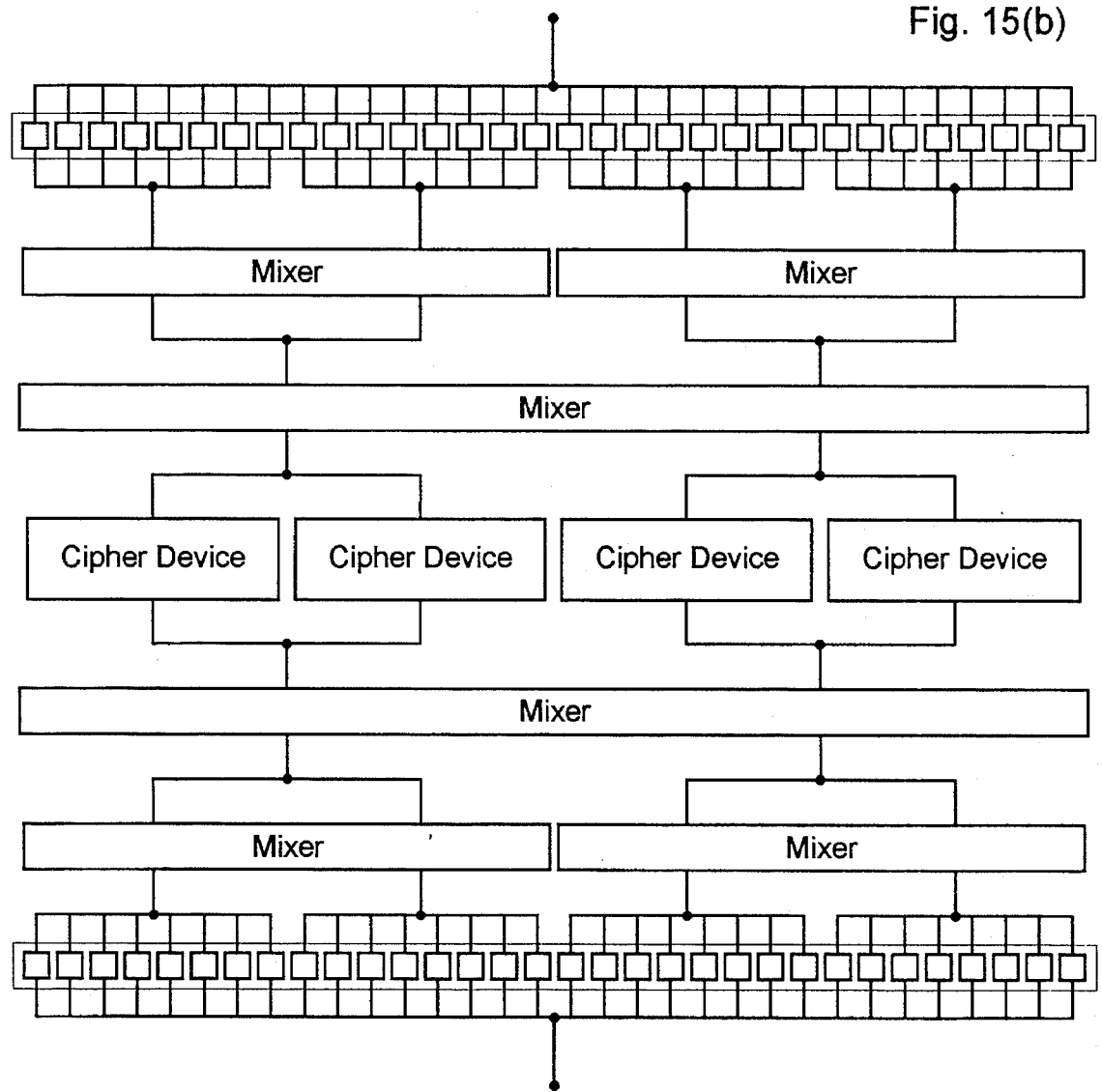

FIGS. 15(a) and 15(b) show various other fenced block cipher mechanisms that may be used as cryptographic mechanism 100. FIG. 15(a) shows a 4× fenced construct with 1× strength. FIG. 15(b) shows a variation on 4× fenced block ciphers.

Balanced Block Mixers in combination with Substitution Mechanisms

Figure 16:
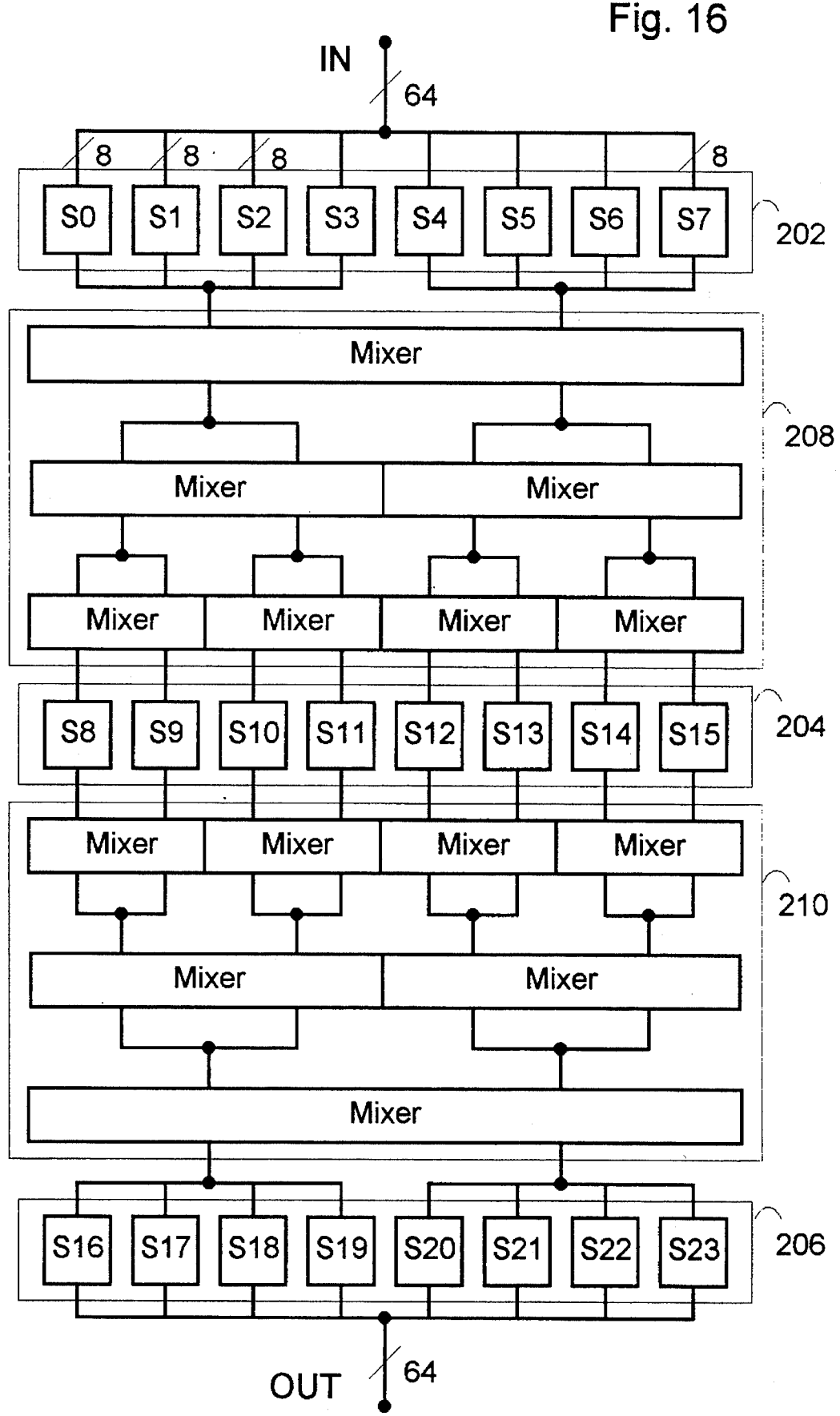
Figure 17:
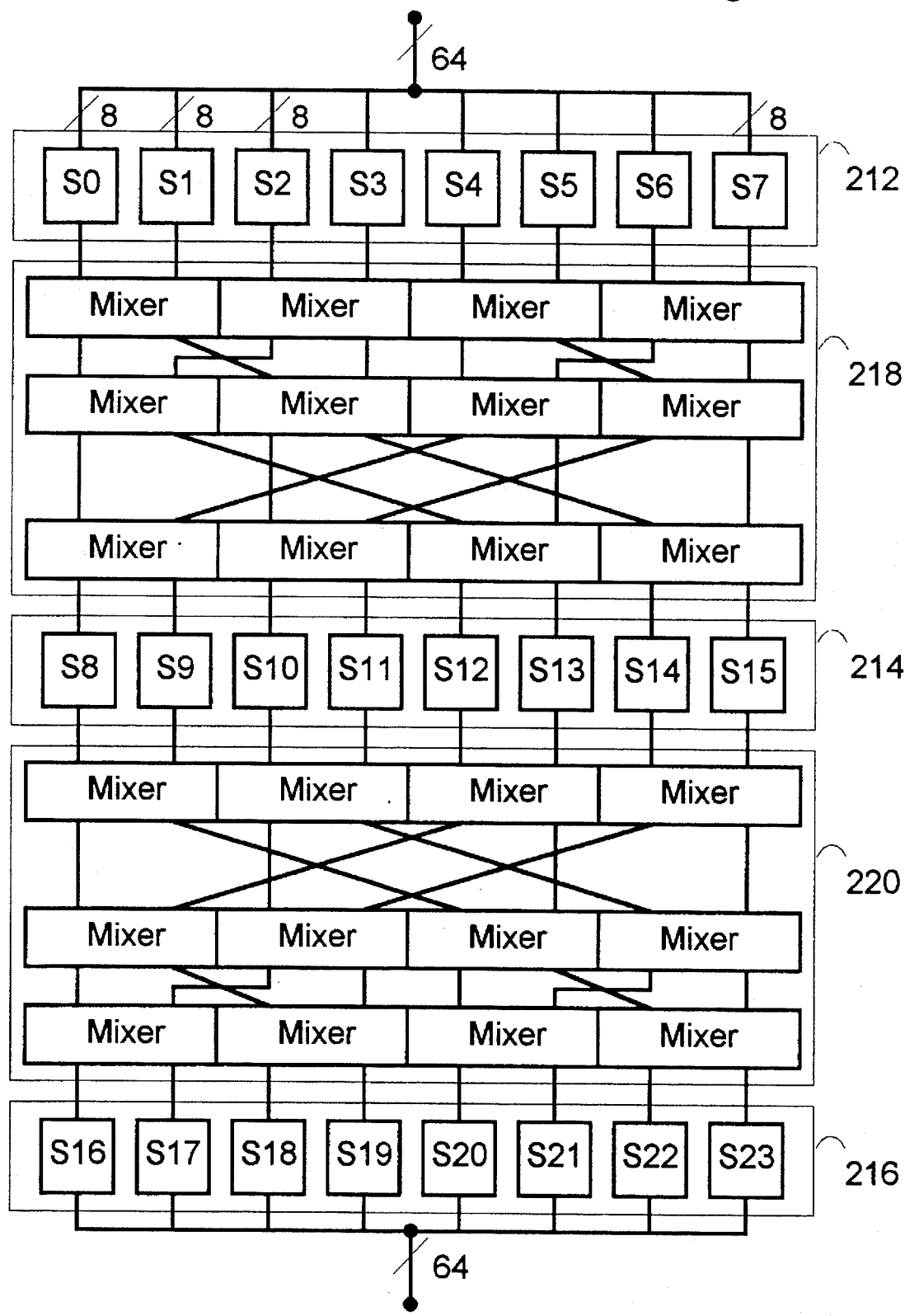

In some embodiments of cryptographic mechanism 100, balanced block mixers are combined with substitution mechanisms without the use of other cipher mechanisms. For example, the cryptographic mechanism of FIG. 16 is a 64-bit block cipher using three fencing layers (of substitution mechanisms) 202, 204, and 206, and balanced block mixers (in two groups 208, 210 of balanced block mixers). As another example, the cryptographic mechanism 100 shown in FIG. 17 depicts a 64-bit block cipher using three fencing layers 212, 214, 216 and balanced block mixers with FFT-style mixing (in two groups or layers 218 and 220 of balanced block mixers). Note here that the output of each substitution mechanism eventually propagates over the entire message since the outputs of the balanced block mixers are fed to adjacent balanced block mixers.

In the discussion above, the term "cipher mechanism" has been used to described mechanisms that are used as components of cryptographic mechanisms. However, it should be clear that each cryptographic mechanism described herein can itself be used wherever a cipher mechanism is used in the description. For example, the 64-bit cipher mechanism of FIG. 12 can be a 64-bit version of the cryptographic mechanism of FIG. 10.

A Multiple Size Block Cryptographic Mechanism

This invention provides many ways to increase the block size of a cryptographic mechanism. This makes for stronger cryptographic mechanisms, but it can cause inefficiencies in their use. In particular, if the length of a message to be encrypted (or decrypted) is not a multiple of the block size, then part of one block will be empty (and therefore wasted). It is possible for almost an entire block to be empty.

Figure 18:
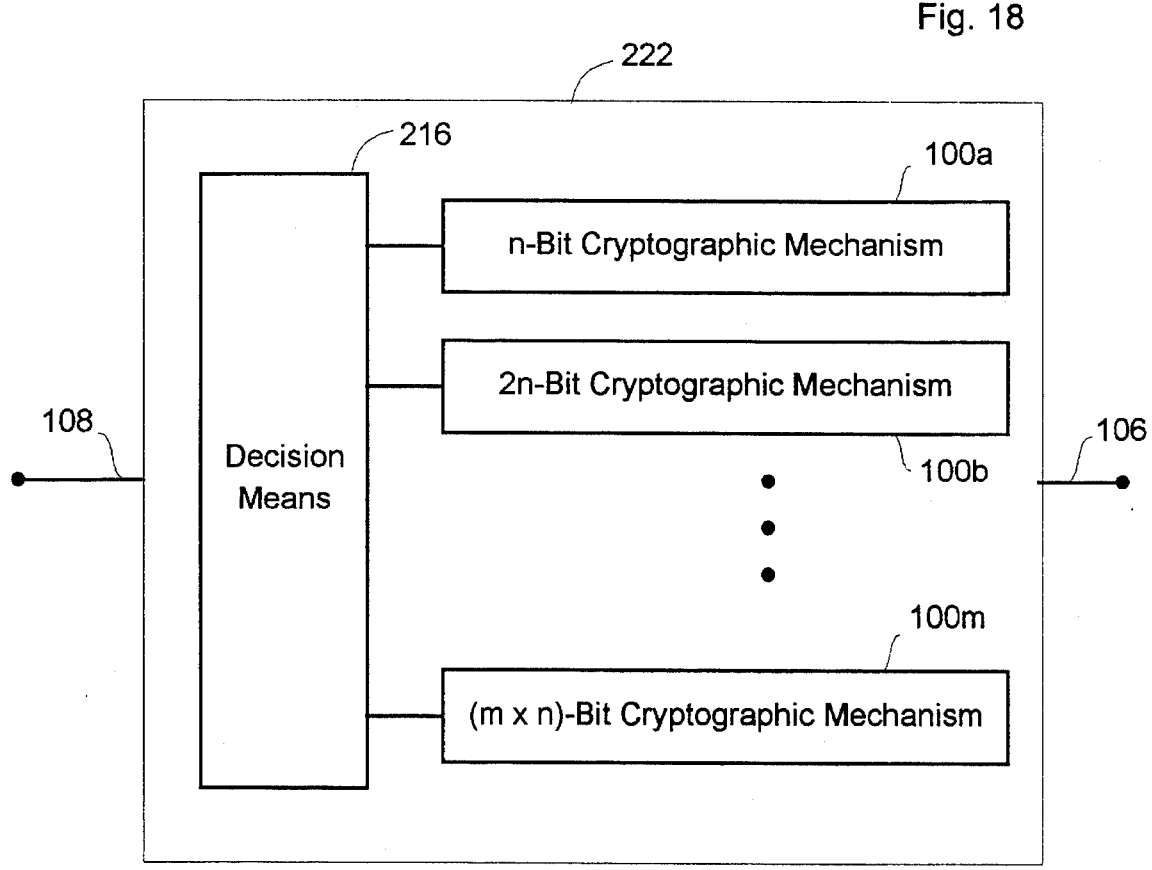
FIG. 18 is a schematic diagram of a multiple block-size cryptographic mechanism according to the present invention.

With reference to FIG. 18, a multiple-size cryptographic mechanism 222 comprises m cryptographic mechanisms 100a–100m, having different block sizes and a decision means 216. For example, cryptographic mechanism 222 has cryptographic mechanisms with block sizes which are different multiples of n. There is an n-bit cryptographic mechanism 100a, a 2n-bit cryptographic mechanism 100b, up to an (m×n)-bit cryptographic mechanism 100m. These cryptographic mechanisms can be made up of any of the cryptographic mechanisms described above or of other cryptographic mechanisms. The decision means 216 of cryptographic mechanism 222 operates as follows to select among the cryptographic mechanisms so as to process the message: When an input signal is to be enciphered, a particular cryptographic mechanism 100a–100m is chosen based on the length of the input signal so as to minimize the wasted block space in the output signal. In one embodiment, the decision means always selects the cryptographic mechanism which can process the input block with the least waste. In another embodiment, in the case where the entire length of the input data block is known in advance, decision means 216 can select an optimal combination of cryptographic mechanisms 100a–100x, and use them in any order (the order in which they are used must be known by a decipherer). When the entire size of the input message is known in advance, and when the optimal combination of cryptographic mechanisms is chosen, the input message can be processed by these mechanisms in any order, in a fixed order, or in an order based on a key. Note that decision means 216 need not be a part of the cryptographic mechanism 222, but can instead be incorporated into the system which employs the multiple-size cryptographic mechanism 222. In that case, cryptographic mechanism 222 would be given blocks of a size (corresponding to the size of one its component cryptographic mechanisms 100a–100m), along with some indication as to the size of the current input block.

For example, if n is 64, and m is 8, then cryptographic mechanism.222 has eight cryptographic mechanisms 100a–100h, one for each of 64-bit, 128-bit, . . . , 512-bit blocks. An input message of 514 bits would use the 512-bit cryptographic mechanism and the 64-bit cryptographic mechanism, with a waste of only 62 bits. (If only the 512-bit cryptographic mechanism was used, the waste would be 510-bits.)

While the invention has been described in connection with what are presently considered to the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. An invertible balanced block mixer cryptographic mechanism for mixing each of some number x input blocks of some block size into each of said number x output blocks of said block size, comprising:

said number x mutually orthogonal latin square mixing or combiner mechanisms of order 2 to the power n, where n is said block size in bits.

2. A balanced block mixer mechanism for the invertible mixing of two input blocks of some block size n in bits into two output blocks of said block size n, comprising:

A first latin square mixing mechanism of order 2 to the power n for combining said two input blocks into the first of said two output blocks; and A second latin square mixing mechanism of order 2 to the power n, orthogonal to said first latin square mixing mechanism, for combining said two input blocks into the second of said two output blocks.

3. The invertible mixer of claim 2 wherein the latin square mixing used in at least one said latin square mixing mechanism is explicitly described in an array.

4. The invertible mixer of claim 2 wherein the latin square mixing used in at least one said latin square mixing mechanism is implicitly described by a pre-determined computation.

5. The balanced block mixing method for the invertible mixing of two input blocks of some block size n in bits into two output blocks of said block size n, comprising the steps of:

combining the two input blocks by using a first latin square mixing of order 2 to the power n to produce the first of said two output blocks; and combining the two input blocks by using a second latin square mixing of order 2 to the power n, orthogonal to said first latin square mixing, to produce the second of said two output blocks.

6. The invertible mixing method of claim 5, wherein at least one said latin square mixing is described in an array.

7. The invertible mixing method of claim 5, wherein at least one said latin square mixing is described by a pre-determined computation.

8. A balanced block mixer cryptographic mechanism for mixing each of some number n greater than 2 input blocks of some block size into each of said number n output blocks of said block size, comprising:

said number n mutually orthogonal latin square mixing or combiner mechanisms of order 2 to the power n, where n is said block size in bits.

9. A balanced block mixer mechanism for mixing two input blocks of some block size n in bits into two output blocks of said block size n, comprising:

a first latin square of order 2 to the power n, described in an array, for combining said two input blocks into the first of said two output blocks; and a second latin square of order 2 to the power n, described in an array, orthogonal to said first latin square, for combining said two input blocks into the second of said two output blocks.

10. The method of using an inverse to an original orthogonal latin squares mixing of order 2 to the power n, where n is the block size in bits, to recover the original input values from each mixed result, comprising the steps of:

producing an inverse orthogonal latin squares mixing of order 2 to the power n, which is the inverse to said original orthogonal latin squares mixing; and for each said mixed result, presenting said mixed result to said inverse latin squares mixing and collecting said original input values from the result of that mixing.

* * * * *